(12) United States Patent
Barnett et al.

(10) Patent No.: US 8,612,876 B2
(45) Date of Patent: *Dec. 17, 2013

(54) MULTI-LAYERED ONLINE CALENDARING AND PURCHASING

(75) Inventors: Theodore H. Barnett, San Francisco, CA (US); Anthony A. Espinoza, San Francisco, CA (US); Vengpui Louis Lao, San Francisco, CA (US); David C. Sobotka, Redwood City, CA (US); Andrew W. Zaeske, Los Altos, CA (US)

(73) Assignee: When, Inc., Redwood City, CA (US)

( * ) Notice: Subject to any disclaimer, the term of this patent is extended or adjusted under 35 U.S.C. 154(b) by 881 days.

This patent is subject to a terminal disclaimer.

(21) Appl. No.: 11/671,323

(22) Filed: Feb. 5, 2007

(65) Prior Publication Data

US 2007/0129986 A1 Jun. 7, 2007
US 2011/0307816 A9 Dec. 15, 2011

Related U.S. Application Data

(63) Continuation of application No. 10/116,301, filed on Apr. 3, 2002, now Pat. No. 7,174,517, which is a continuation of application No. 09/265,515, filed on Mar. 10, 1999, now Pat. No. 6,369,840.

(51) Int. Cl.
*G06F 3/048* (2013.01)

(52) U.S. Cl.
USPC .......................................... 715/767; 715/963

(58) Field of Classification Search
USPC .............................................. 715/767; 705/8
See application file for complete search history.

(56) References Cited

U.S. PATENT DOCUMENTS

| | | | | |
|---|---|---|---|---|
| 5,323,314 A | * | 6/1994 | Baber et al. | 705/7.19 |
| 5,596,373 A | | 1/1997 | White et al. | |
| 5,960,406 A | * | 9/1999 | Rasansky et al. | 705/9 |
| 6,018,343 A | * | 1/2000 | Wang et al. | 715/733 |
| 6,064,977 A | * | 5/2000 | Haverstock et al. | 705/9 |
| 6,085,235 A | * | 7/2000 | Clarke et al. | 709/219 |
| 6,269,341 B1 | * | 7/2001 | Redcay, Jr. | 705/8 |
| 6,369,840 B1 | * | 4/2002 | Barnett et al. | 715/853 |
| 6,480,830 B1 | * | 11/2002 | Ford et al. | 705/9 |
| 6,591,244 B2 | | 7/2003 | Jim et al. | |
| 6,934,740 B1 | * | 8/2005 | Lawande et al. | 709/213 |
| 7,039,596 B1 | * | 5/2006 | Lu | 705/7.13 |
| 7,259,770 B2 | * | 8/2007 | Miyata | 345/620 |
| 2001/0014867 A1 | * | 8/2001 | Conmy | 705/9 |
| 2005/0289109 A1 | * | 12/2005 | Arrouye et al. | 707/1 |

OTHER PUBLICATIONS

Arizona Opera 1999/2000 Season; Copyright 1996-1999.

* cited by examiner

*Primary Examiner* — Boris Pesin
*Assistant Examiner* — Matthew Ell
(74) *Attorney, Agent, or Firm* — Finnegan, Henderson, Farabow, Garrett & Dunner, L.L.P.

(57) ABSTRACT

A computer-implemented method and system for generating and displaying a calendar containing user-selected events from user-selected categories. A plurality of categories of events are provided. The user can select which categories are of interest, and then select individual events within those categories. Events are overlaid on a calendar unique to the user. Calendars may also be shared among a number of selected users, if desired. Online purchasing and related actions can be associated with each event.

23 Claims, 24 Drawing Sheets

My Calendar | Event Directory | What's New

Welcome Back Amir! —501

We hope you continue to enjoy and explore When.com. Please let us know what you think about When.com and how we can make our service more valuable to you.
—502

Highlights
Career Fairs - See who's hiring in your area and find a great new job in the career fairs section of the general industry trade show channel. —502

What's New
Books - We've added a new book genre category; Eclectic (covering humor and the occult). —502

Thursday, March 04, 1999 —501

Hints and Tips —502
For more convenient access to your personal or group calendar, make When.com your homepage. Just go to our help pages for easy instructions.

[ Go to the Event Directory ] —503

[ Go to your Calendar ] —504

Create a Group Calendar —505

Corporate info | Jobs at When | Privacy Policy
Feed back & Email Support  Help

FIG. 5

MULTI-LAYERED ONLINE CALENDARING AND PURCHASING

CROSS-REFERENCE TO RELATED APPLICATIONS

This application is a continuation of U.S. patent application Ser. No. 10/116,301, filed Apr. 3, 2002, now U.S. Pat. No. 7,174,517, which is incorporated herein in its entirety by this reference thereto, and which application is a continuation of U.S. patent application Ser. No. 6,369,840.

BACKGROUND OF THE INVENTION

1. Field of the Invention

The present invention relates generally to software for generating and manipulating computer-implemented planning calendars, and more particularly to a system and method of multi-layered online calendaring and purchasing.

2. Description of Background Art

Conventional software applications for calendaring and scheduling generally take one of two forms: stand-alone or networked. In a stand-alone calendaring application, some sort of user interface is provided which allows a user to specify dates and times for events. Events may then be viewed on a day-by-day, week-by-week, or month-by-month basis, depending on the user's wishes. In many such applications, selective viewing of certain predefined categories of events is provided.

An example of a stand-alone calendaring application is ÒIn ControlÓ by Attain Corporation. Many other calendaring applications are available which offer similar features. In ÒIn ControlÓ, three views of the user's calendar information are available: Outline, Calendar, and Day. Outline View allows the user to view events in a list format, and also permits hierarchical arrangement of the event descriptions. A date and time can be associated with each event, and the user can also specify other types of information, such as priority, description, and the like. In Calendar View, a conventional calendar is displayed. Events from the Outline View are shown on the calendar in their appropriate locations according to the date associated with each event. The user can specify the range of dates to be displayed, such as for example one week, two weeks, or one month. In Day View, events for a single day are shown on a display resembling a conventional paper dayplanner. Items having a specific time are shown within the daily schedule at the appropriate time. Events not having a specific time are listed in a ÒTo-DoÓ list next to the scheduled events.

Stand-alone calendaring applications, such as ÒIn ControlÓ, are effective for managing one's calendar, but they do not provide an easy mechanism for importing events from an outside source in an automated manner. For example, if a user is planning to attend a baseball game at 7:30 p.m. on Thursday, the entry for the baseball game must be manually entered in the calendaring application. Such applications do not provide an easy way to automatically import such information from, for example, a list of sporting events from an outside source. The following disadvantages present themselves:

Manual entry of events is prone to errors;

If the scheduled event changes, the user may not be aware of the change and may fail to reflect it in the calendar; and The above-described method does not provide a way to inform the user of events that may be of possible interest.

In addition, stand-alone applications do not provide the capability of sharing one's calendar information with other users.

Some prior art calendaring applications operate in a networked environment and thereby allow sharing of calendar information. Individuals' calendar information can be shared across a network connection (if the owner of the information grants permission for such access). Applications such as Microsoft Outlook, from Microsoft Corporation, provide this type of functionality. However, such applications do not generally provide the ability to import event information from outside sources on a category-by-category basis, and then to select individual events from selected categories for inclusion in a user's personal calendar. Furthermore, such applications do not provide a multi-layered calendaring system wherein events belonging to different categories and selected by a user can be overlaid on one another in a single integrated calendar.

Relatively recently, hosted calendaring applications have been developed which store, in a central location, all calendaring information for a large number of users. Such prior art systems include, for example, appoint.net (www.appoint.net), Yahoo! Calendar (calendar.yahoo.com), and EventCenter from Amplitude Software Corp. (www.amplitude.com). Users access their calendar information across a network, such as the Internet, and security is assured by requiring that each user provide a login and password when accessing the system.

Some of these hosted calendaring systems allow users to add events from outside sources to their personal calendars, if desired. In general, however, such capability is limited in its flexibility. In particular, none of these calendaring systems allow a user to select a category of events, and subsequently add individual events from the category to a personal calendar. Furthermore, none of these systems provide a multi-layered calendaring system wherein events belonging to different categories and selected by a user can be overlaid on one another in a single integrated calendar.

What is needed is a calendaring application that allows a higher level of flexibility in the way events can be imported and viewed.

What is further needed is a calendaring application that permits a user to select categories of events that are of interest, and which. provides features allowing a user to add selected events from those categories to his or her personal calendar.

What is further needed is a calendaring application that allows a user to associate layers with certain subsets of events, and to selectively view any desired combination of layers in an integrated manner on a personal calendar page.

What is further needed is a calendaring application that allows a user to share selected calendar information, including selected events, with other users.

What is further needed is a calendaring application that allows a user to purchase products, services, or tickets associated with an event, using online communication means.

SUMMARY OF THE INVENTION

In accordance with the present invention, there is provided a multi-layered online calendaring and purchasing system and method which allows a user to specify categories of events, to view events belonging to the specified categories from outside sources, and to add selected events from the outside sources to a personal calendar. The user can choose which categories of selected events are to be displayed, in any combination he or she desires. The user's personal calendar can also be shared with other users, or selected events and/or categories can be shared, as desired. The user can set up a group calendar, specifying the members in the group, where every group member can access the calendar and make changes to it. Different levels of access can be specified for different members of the group. The user can also import events from other users' calendars. In addition, purchases of products, services, or tickets can be effected using links associated with displayed events.

A user logs onto the calendaring system by providing a unique login name and password that identifies the user and allows the system to retrieve that user's personal calendar and associated information. In one embodiment, as described below, the calendaring system is hosted on a server that is connected to the Internet, and the user logs in by interacting with the server via a web page.

Once the user has logged in, he or she can enter any of several different areas of the system, in order to perform different types of activities. An Event Directory allows the user to select categories of events that are of interest. An Event Tracker allows the user to view events associated with selected categories, to obtain more details concerning such events, and to selectively add events to the user's personal calendar. A My Calendar area provides several views of the user's personal calendar, including events that were selected using the Event Tracker, as well as events that have been manually added by the user. In the My Calendar area, the user is able to view and manipulate any of these events. Finally, a What's New area is available for alerting the user to new categories and events that may be of interest; this area may also be used to emphasize particularly important events.

The Event Directory provides listings of event categories, preferably arranged by area of interest. Event categories include, for example, movie opening dates, sporting events, computer tradeshows, and the like. Users can develop their own event categories and share them with other users by publishing them on the Event Directory. The user can click on any event category and view a list of events belonging to that category. Additional information can be obtained for each of the events. The user can choose to select any event categories for inclusion in the Event Tracker. The user can also select a ÒlocalizedÓ option which restricts events to those located in the user's city, state or other region.

The Event Tracker displays a list of events belonging to the selected categories. The user can select from several different views of the displayed events and can also choose to view one category at a time, or all categories at once. Events can be sorted by date or by category, as desired. The user can click on a button to add a particular event to his or her personal calendar. In addition, the user can click on a button for online ordering and purchasing of products, services, or tickets as appropriate for the particular event.

The My Calendar area provides an extremely flexible and configurable personal calendar. The user can choose from daily, weekly, or monthly views, and can select particular categories of events to be displayed, or can choose to see all events. Thus, the system provides a multi-layered calendar, where each layer corresponds to an event category. Viewing multiple categories simultaneously provides an integrated personal calendar showing all events in one place. The user can add appointments and other events manually in the My Calendar area, and such events are displayed alongside events that were selected in the Event Tracker. The user can also specify that he or she would like to be notified when an event is about to occur, either by e-mail or by some other communications means. Finally, the user can specify whether he or she would like to share the personal calendar with other users.

BRIEF DESCRIPTION OF THE DRAWINGS

FIG. 5 is a screen shot of a What's New page.

DETAILED DESCRIPTION OF THE PREFERRED EMBODIMENTS

System Architecture

Figure 1:
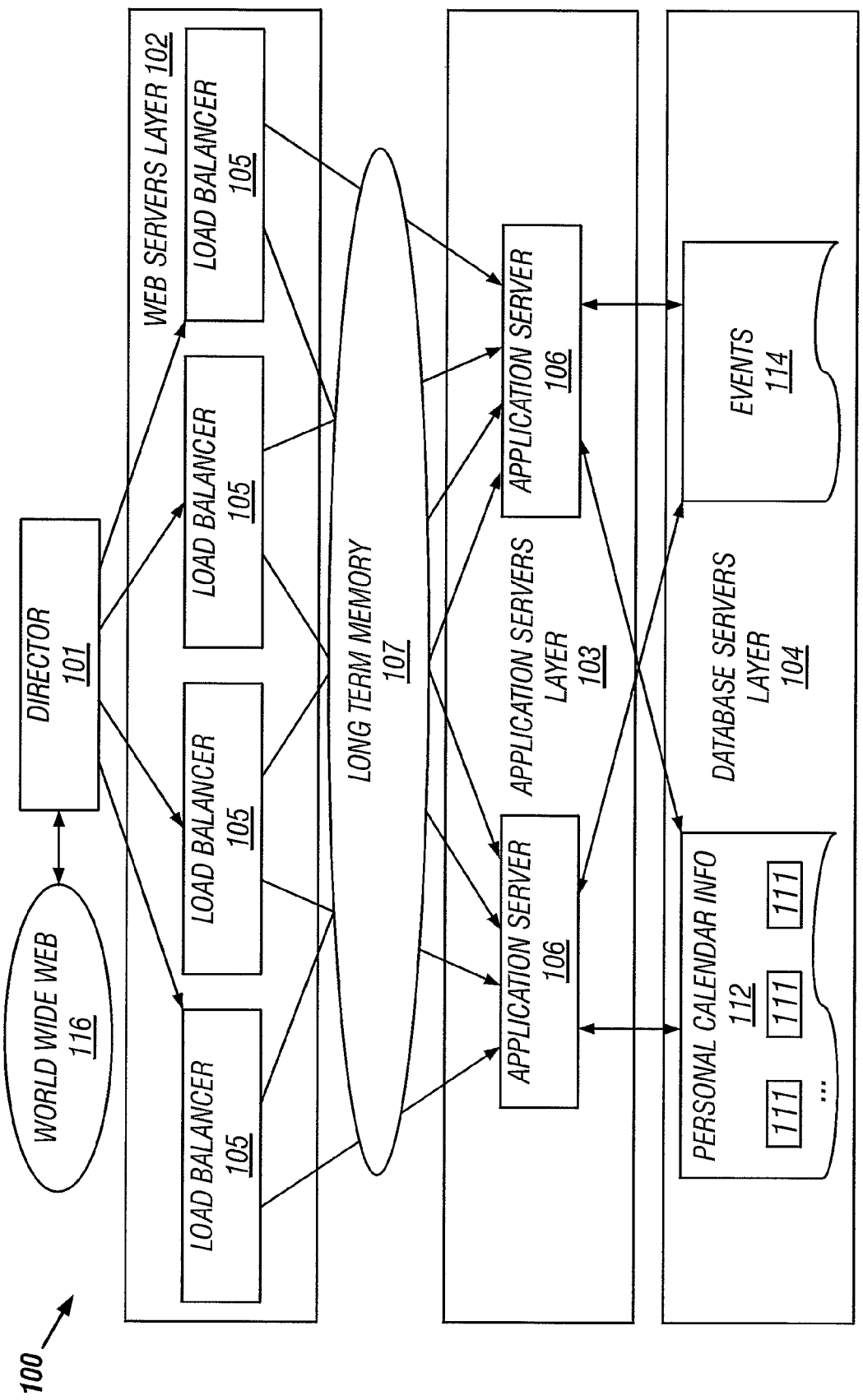
FIG. 1 is a block diagram of the overall architecture of an embodiment of the present invention.

Referring now to FIG. 1, there is shown a block diagram of the system architecture of an embodiment of the present invention. System 100 is implemented in a networked computing environment. Individual elements communicate with one another using standard protocols such as, for example, Transfer Control Protocol/Internet Protocol (TCP/IP) and Hypertext Transfer Protocol (HTTP), over a data communication line such as a T1 or T3 line. Other implementations are also possible, and system 100 may even be implemented on a non-networked computer, if desired.

In one embodiment, the present invention operates in a networked environment such as the Internet or an intranet, and pages are provided for user access and interaction via a browser over the World Wide Web 116, as is known in the art.

Director 101 connects an individual client computer (not shown) to system 100. Director 101 handles the low-level interaction with an individual client computer, and accepts input and output for transmission to and from web servers layer 102. In one embodiment, where several load balancers 105 are provided within layer 102, director 101 selects the least loaded load balancer 105 for connection, so that the load is relatively balanced among the components of web servers layer 102. Director 101 is also able to invoke a thread to determine if the user is a new or returning user, based on either 1) the particular Uniform Resource Locator (URL) string used to connect to system 100; or 2) a ÒcookieÓ file that has previously been stored on the user's machine. If the user is a returning user, director 101 can call a What's New page which retrieves personal calendar information from database servers layer 104 and presents relevant information to the user as appropriate.

In one embodiment, director 101 is implemented using Big IP, from F5 Labs, Inc., for connecting web servers layer 102 to the World Wide Web 116 in a multiplexed manner for optimal load balancing.

Web servers layer 102 contains one or more load balancers 105 for determining which application server 106 is best able to handle a particular connection for a particular user. In one embodiment, load balancers 105 are implemented as Sun Microsystems Ultra 5 servers running a load balancing client. New users are sent to the least-loaded application server 106. Returning users are sent to the application server 106 containing the process that serviced the user during the most recent connection with that user. This technique advantageously facilitates access to a previously stored user cache, which improves performance as will be described below in connection with FIG. 1A. A long-term memory (LTM) 107 provides a mechanism for storing information as to which process serviced the user in the past, so that this information can be retrieved by load balancers 105 upon the user's return.

Application servers layer 103 contains one or more application servers 106. Application servers layer 103 provides an intermediate layer between database layer 104 and web server layer 102. Application servers 106 run the software code for interacting with database layer 104 and for retrieving, modifying, and storing data in databases 112 and 114. In one embodiment, each application server 106 is a Sun Microsystems Enterprise 450 server. Database servers layer 104 contains databases such as personal calendar information database 112, events database 114, and the like, for maintaining scheduling and other information for users of the system, and also maintaining information describing scheduled events and announcements. In one implementation, individual databases within layer 104 are stored on separate database servers such as Sun Microsystems Enterprise 4500 servers. Databases may be stored in parallel redundant fashion for backup purposes. Personal Calendar Information database 112 contains various types of data, including personal event data 111 for various users. Events database 114 can also connect with other data sources (not shown) as desired, so that information describing events can be imported and made available to users of system 100.

In an alternative embodiment, each database in database servers layer 104 can be split into a plurality of smaller databases, each for a subset of users.

Figure 1A:
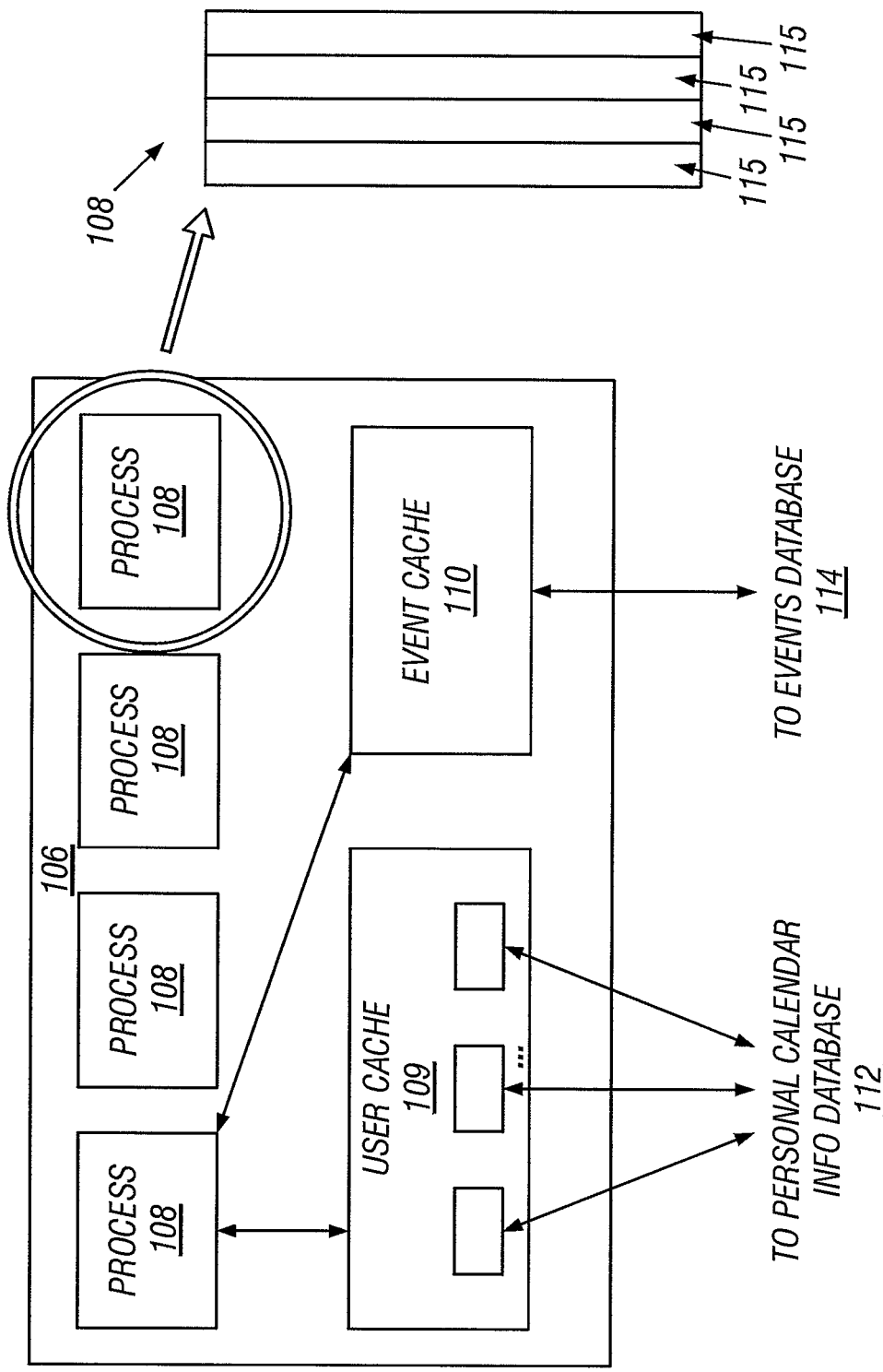
FIG. 1A is a block diagram of an application server according to the present invention.

Referring now to FIG. 1A, there is shown a block diagram of an application server 106 according to one embodiment of the present invention. Application server 106 serves personal calendars, event directory contents, user profiles, and other types of pages to users in response to Hypertext Transfer Protocol (HTTP) requests relayed by load balancers 105 in web servers layer 102. In one embodiment, server 106 is implemented as a set of shared libraries that are dynamically linked and loaded at runtime.

Application server 106 is capable of running a number of processes 108 simultaneously. Upon initial connection by a particular user, the user is assigned to a selected process 108, based on load balancing parameters.

Each process 108 contains a number of simultaneously-executing application threads 115. Application server processes 108 interact with user cache 109, which provides temporary storage of personal calendar information for particular users. Such information may include, for example, the user's selected settings and options, favorite events, and other information. Cache 109 obtains information from personal calendar information database 112 as needed, and writes information to database 112 when appropriate. Cache 109 provides improved performance by obviating the need for a direct connection between process 108 and database 112. In one embodiment, cache 109 for a particular user is released from memory when either some predetermined time period expires, or when memory is needed and that user's data is the oldest cache 109 that has not yet expired.

Process 108 also interacts with event cache 110, which provides temporary storage of event data taken from events database 114.

In one embodiment, process 108 remembers where a particular user's cache 109 is located, so that if the user returns to the site (i.e. re-establishes a connection) and his or her cache 109 is still available, process 108 is able to utilize the cache 109.

Figure 1B:
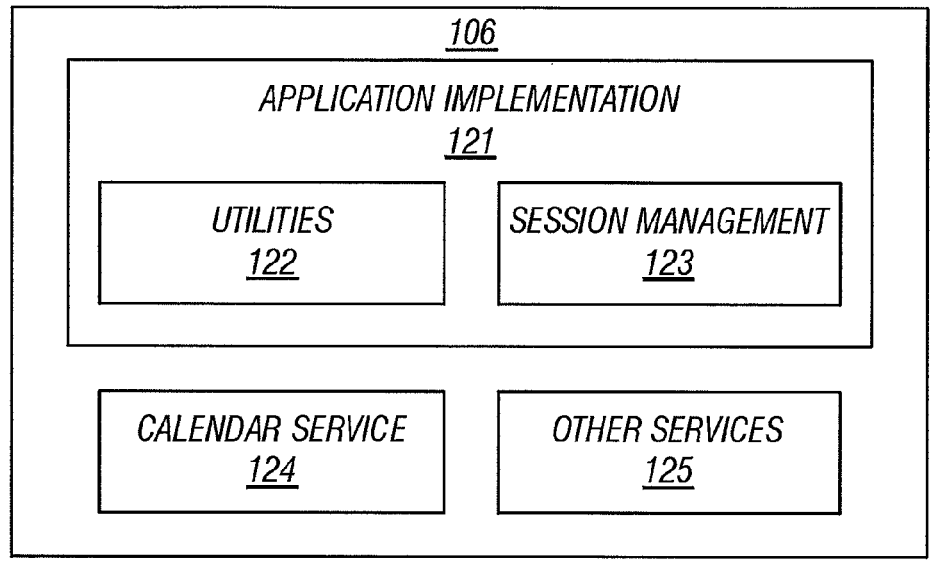
FIG. 1B is a block diagram of the services implemented in one embodiment of an application server according to the present invention.

Referring now to FIG. 1B, there is shown a block diagram of the services implemented in one embodiment of an application server 106 according to the present invention. Application implementation 121 implements each page of the user interface using templates and a component-driven user interface implementation. Application implementation 121 also parses HTTP parameters and generates HTML output for pages. Utilities 122 include implementations for parsing and formatting functions, high-level calendar operations, and e-mail notification services. Session management 123 authenticates, tracks, and manages user sessions for calendaring operations, and stores a cache of user and calendar data as needed to maintain sessions. Calendar service 124 implements the core object model for accessing user profiles, calendars, events, calendar links, and collections of objects. Service 124 also implements event lookup, object caching, and persistence. Finally, service 124 serves both personal calendars and event directory data using a common object model. Other services 125 provide access to noncalendar-oriented data services such as weather, horoscope, and application configuration settings. The operation of the relevant components of application server 106 to implement the present invention will be described in more detail below.

Client Computer

Figure 2:
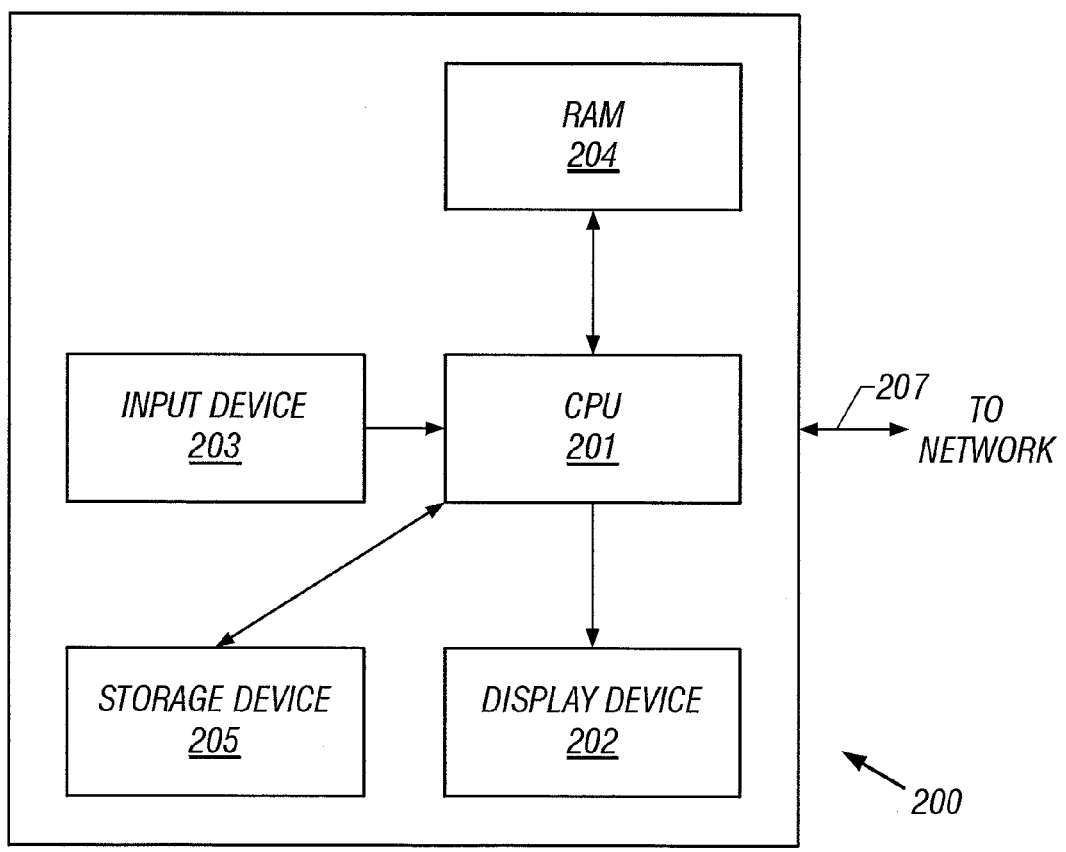
FIG. 2 is a block diagram of an embodiment of a client computer for practicing the present invention.

Referring now to FIG. 2, there is shown a block diagram of a client computer 200 that can be connected to system 100 for practicing the present invention. In one embodiment, client computer 200 is implemented on a personal computer running the Microsoft" Windows$^a$ 95 operating system on an Intel" Pentium" processor. The user interacts with the present invention by establishing a network connection with director 101 over the World Wide Web 116 using a TCP/IP connection and a browser application running on the aforementioned client computer 200. Thus, as the user operates the present invention, he or she is presented with interactive web pages that provide information and accept input, as is known in the art. One skilled in the art will recognize that other embodiments, including other types of software applications, processors, and operating systems, are also possible. In the block diagram of FIG. 2, client computer 200 is shown having a central processing unit (CPU) 201, display device 202, input device such as a pointing device 203, random access memory (RAM) 204, and storage device 205. Also provided is a connection 207 to a network such as the World Wide Web 116, in order to establish contact with system 100 of the present invention. The following detailed description of the invention will make reference to exemplary implementations of such components, though other embodiments may also be used. For example, CPU 201 is a microprocessor such as an Intel Pentium processor; display device 202 is a conventional monitor or screen such as a cathode-ray tube (CRT); pointing device 203 is a mouse or trackball, though other input devices such as keyboards can also be used; RAM 204 is some quantity of conventional memory as is commonly supplied with personal computers; storage device 205 is a hard disk or similar device for long-term storage of programs and data; and Internet connection 207 is implemented using known protocols such as TCP/IP across a modem, T1 or T3 line, or other connection medium.

In a preferred embodiment, the user interacts with system 100 using a browser application. Such browsers are well known in the art, including for example Netscape Navigator and Microsoft Internet Explorer. One skilled in the art will recognize that other embodiments of the invention, that may operate without use of a browser, are also possible.

For purposes of this description, the terms ÒpageÓ and ÒscreenÓ are used interchangeably to refer to a user interface element presented to the user via the browser.

User Interface and Application Operation

Figure 3:
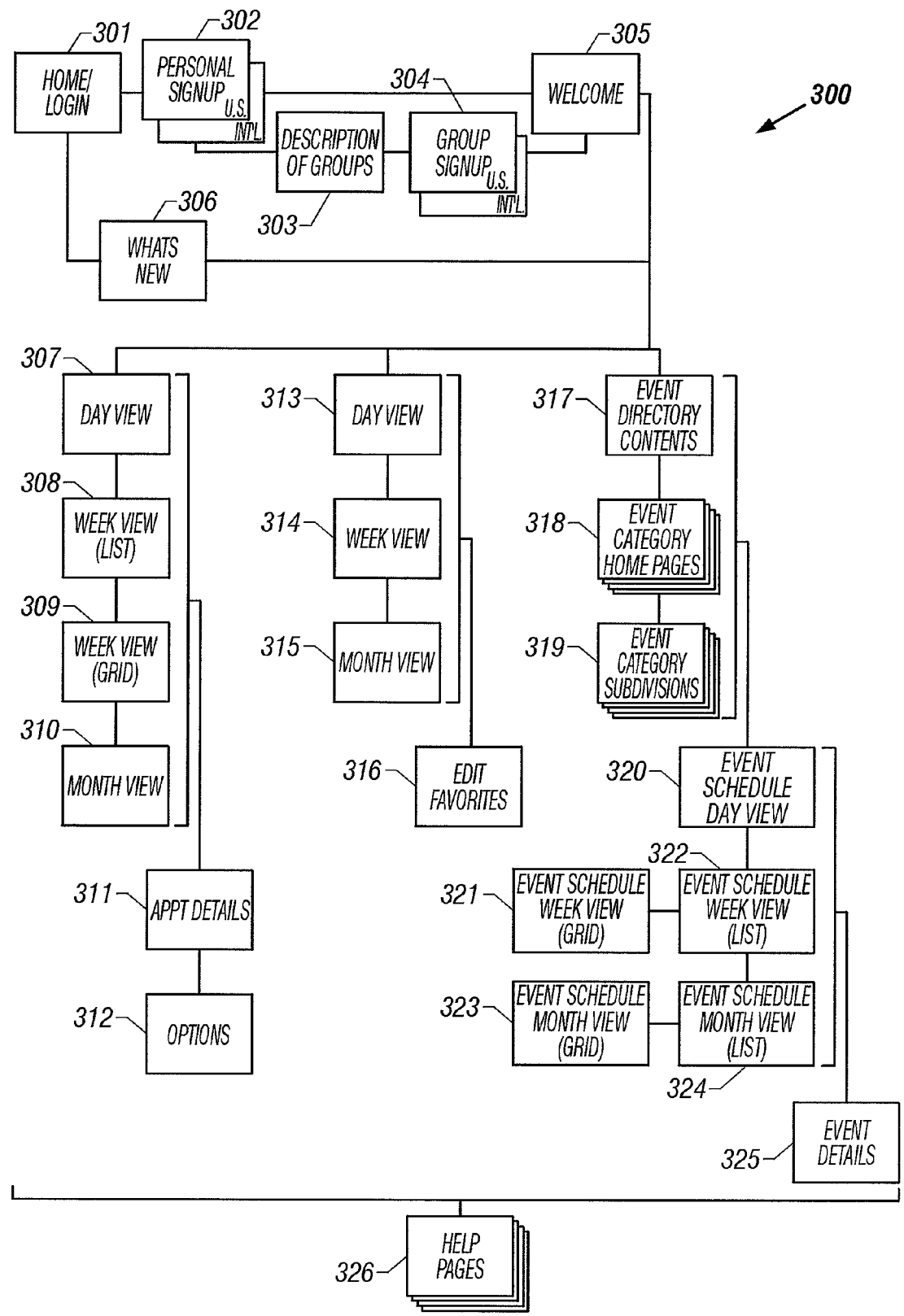
FIG. 3 is a functional block diagram of a block diagram of the functional components of the user interface of the present invention.

Referring now to FIG. 3, there is shown a block diagram of the functional components of the user interface of the present invention. Each of the functional components shown in FIG. 3 will be described in more detail below, with reference to specific screen shots and other user interface elements. As will be seen below, each element in FIG. 3 may be implemented as a web page in an Internet-based application. The user can navigate among the various pages shown by clicking on links in hypertext documents, as is known in the art of browsing web pages. As will be shown in other Figures, one embodiment of the present invention uses a metaphor showing ÒtabsÓ for navigation among the pages.

FIG. 3 also illustrates the overall task flow 300 of one embodiment of the present invention, with connections between elements representing hypertext links from one page to another.

Home/login page 301 welcomes the user to the application or website, upon initial connection. The user may elect to login at this point by providing input specifying a login identifier and password. This allows system 100 to retrieve user-specific information, by reference to a record stored in database 104 of the system.

If the user has not used the system before, he or she is prompted to sign up in 302, by selecting a login identifier and password for future reference. A new record is created and stored for the user. The user is also given the option of signing up in a group using the group sign-up page 304, which allows the user to share his or her calendar with other members of selected groups. Page 303 contains a description of groups and their operation.

Once the new user has signed up using 302 and/or 304, a welcome page 305 is presented, confirming that the user's record has been stored in the system.

Once the user has been identified via user login 301, or signed up and welcomed (302, 304, and 305), a What's New page 306 is presented. As will be described in more detail below, What's New page 306 highlights important events and announcements that may be of interest to the user. New event calendars may also be presented in this screen. In addition, in one embodiment of the present invention wherein shared group calendars are employed, the What's New page 306 can inform users of changes to shared calendars. Finally, the system can display reminders of upcoming events which the user has previously selected.

Event Directory pages 317-319 provide a directory of event categories including Event Directory Contents 317 containing an overall list of event categories, Event Category Home Pages 318, containing descriptions of each of the event categories, and Event Category Subdivisions 319, containing descriptions of subdivisions within particular event categories.

From any of pages 317-319, the user can view schedules of events belonging to a selected category or subdivision. Such event schedules can be viewed in several different formats, such as for example a Day View 320, a Week View in grid format 321, a Week View in list format 322, a Month View in grid format 323, and a Month View in list format 324. Each of these views provide a display of a number of events belonging to a particular category or subdivision. The user can click on a particular event in any of views 320-324 to see an Event Details page 325 showing details for the selected event.

The user can select individual event categories and/or subdivisions for display in Favorite Events pages 313-315. Selecting an event category in this manner is referred to as ÒsubscribingÓ to the event category. Favorite Events pages 313-315 display selected events in either a Day View 313, a Week View 314, or a Month View 315. Pages 313-315 allow a user to select individual events from the selected categories, to be added to the personal calendar. The user can also access an Edit Favorites page 316 which allows him or her to add or remove categories and/or subdivisions from display in Favorite Events pages 313-315.

My Calendar pages 307-310 provide access to the user's personal calendar. My Calendar pages 307-310 show an integrated, multi-layer overview of events from selected categories, as well as manually-entered events. Several displays are available, including a Day View 307, a Week View in list format 308, a Week View in grid format 309, and a Month View 310. Details on any appointment or event are available from the Details page 311. In one embodiment, system uses Event Details page 325 to show details of a selected event that was previously selected from the Event Directory, and Appointment Details page 311 to show details on manually-entered events and appointments. An Options page 312 is also provided, for configuring and selecting among various system options and preferences. Events and appointments can be added, modified, or deleted as desired.

Help pages 326 are provided to assist the user in using the various components of the system. The user can retrieve a selected help page 326 by clicking on a ÒHelpÓ link on any of the pages in the system.

Figure 4:
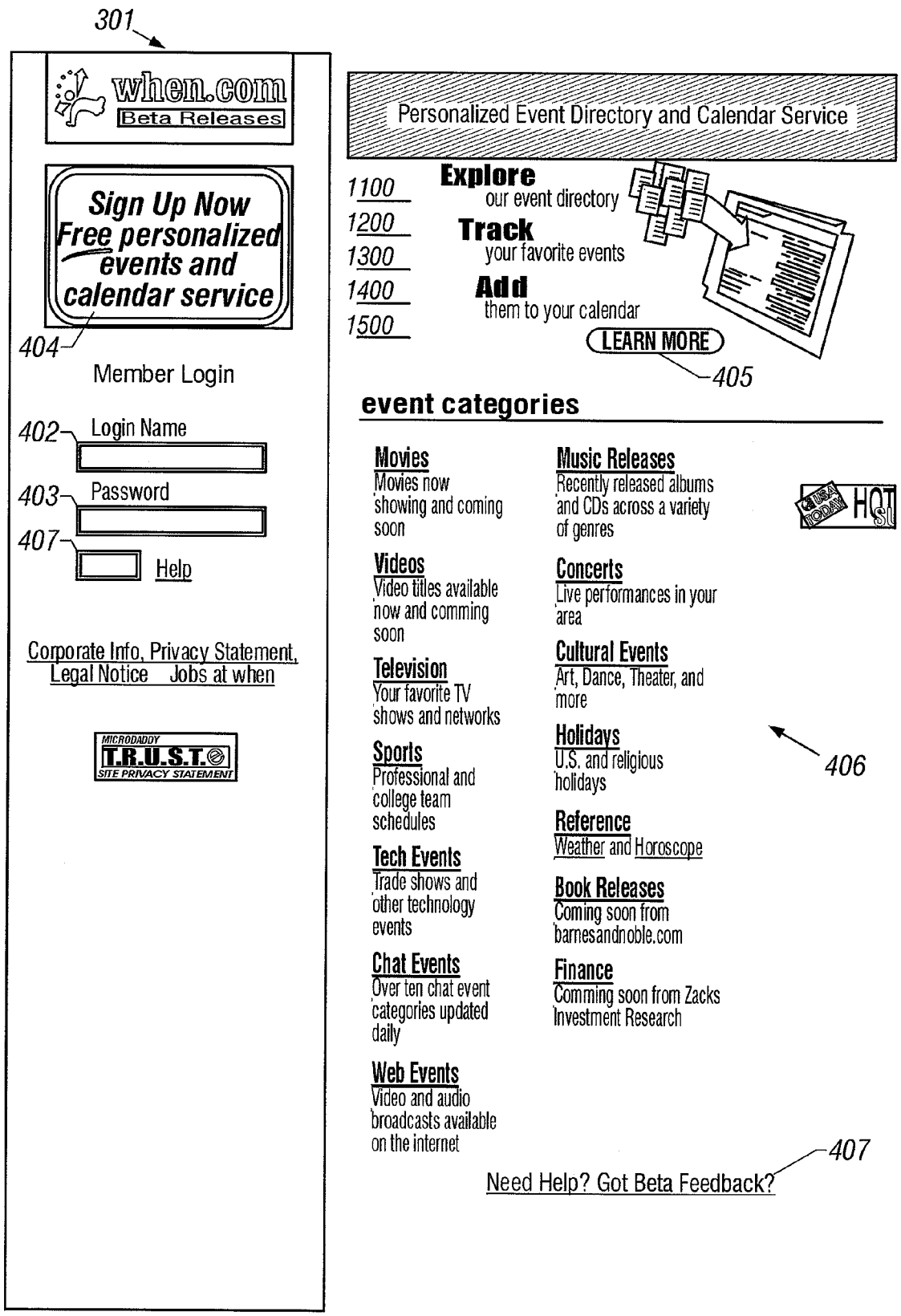
FIG. 4 is a screen shot of a login page.

Referring now to FIG. 4, there is shown a screen shot of a Login page 301 according to one embodiment of the present invention. As with all pages discussed herein, Login page 301 is presented as an HTML page that may be displayed to the user on a conventional browser screen, though other embodiments may use different techniques for presenting user interface elements to the user. Login Name field 402 and password field 403 are provided for the user to enter relevant information allowing the system to identify him or her. In response to the user entering the information, system 100 retrieves centrally stored user-specific information 111 from database 112, including user preferences and personalized calendar information. As described above, such information is retrieved from user cache 109 if available.

Login page 301 also provides links to other pages, for initial sign-up 404, on-line help 407, event categories 406, and miscellaneous information about the service 405.

Referring now to FIG. 5, there is shown a screen shot of a What's New page 306 according to one embodiment of the present invention. A personalized welcome greeting 501 is displayed, as well as any important announcements 502. The information displayed in What's New page is taken from the user's individual records in database 112.

In an alternative embodiment, the What's New page provides information describing changes to shared calendars, new features, and other relevant information. Reminders of upcoming events which were previously selected by the user can be provided as well. Navigation bar 507 provides links to other pages in system 100, including My Calendar pages 307-310, Favorite Events pages 313-315, and Event Directory pages 317-319. Buttons 503 and 504 provide access to Event Directory pages 317-319 and My Calendar pages 307-310, respectively. Links 505 provide access to a Group Calendar feature, as described in more detail.

In one embodiment, a list of new event categories is provided (not shown). This list may include any categories that have been added to system 100 since the user last logged on, or it may be a list of new categories that are related to other categories to which the user has previously subscribed. Thus, system 100 is able to provide event category suggestions that are likely to be of interest to the user, based on his or her previous behavior. The user can select one or more event categories from the list. If desired, the user can obtain additional information on event categories.

Page 306 shown in FIG. 5 is one example of a What's New page according to the present invention. Other configurations of the What's New page are also possible, without departing from the spirit or essential characteristics of the present invention. In particular, additional information can be provided on this page, such as announcements regarding changes to event categories to which the user has previously described. Also, the What's New page may be configurable, so that the user can select what kind of information is displayed there.

Figure 6:
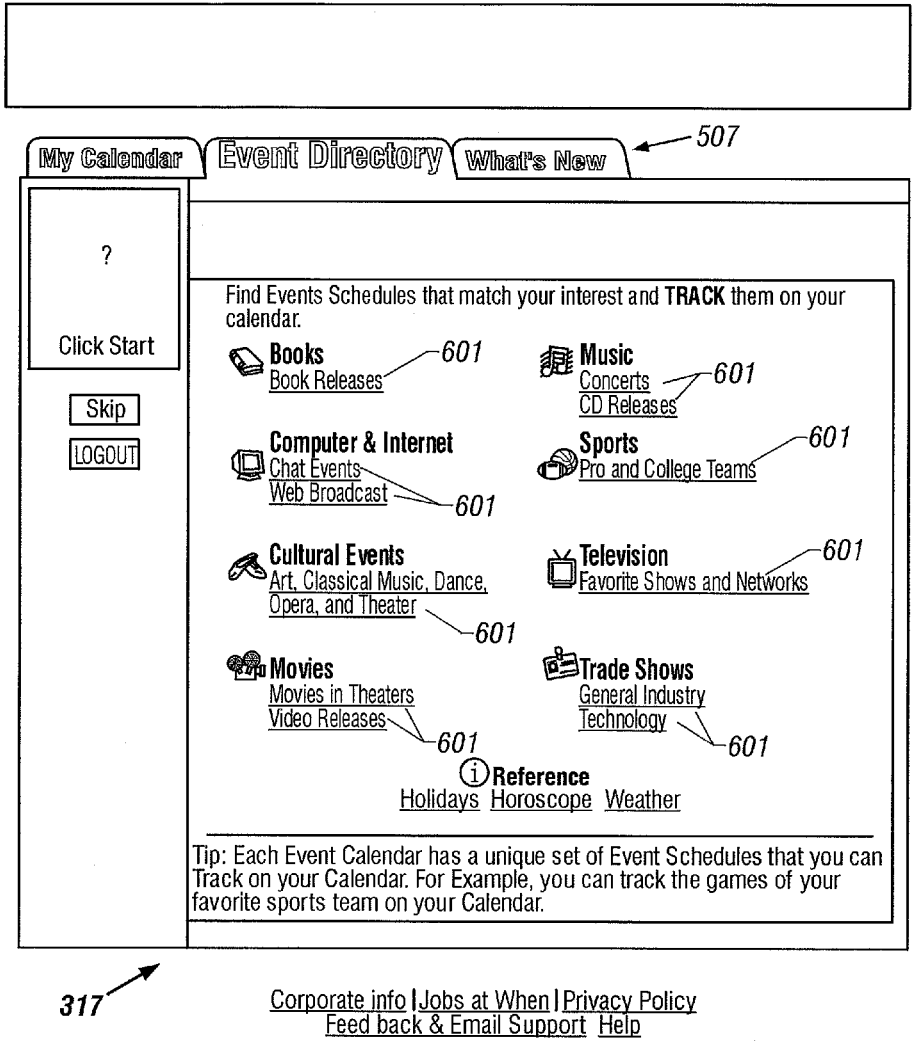
FIG. 6 is a screen shot of an Event Directory page.

Referring now to FIG. 6, there is shown a screen shot of an Event Directory Screen 317. Hyperlinks 601 to event categories are displayed, allowing the user to obtain more information, and if desired, ÔsubscribeÓ to that event category. Each hyperlink 601 links to an Event Category Home Page 318 providing detailed descriptions of event categories. Each event category is a group of related events to which the user can subscribe, if desired. Event categories can include, for example, sports team schedules, movie release dates, schedules of conferences on a particular topic, meeting schedules related to a particular project or company, and the like.

Event categories and related information describing individual events are provided to system 100 and stored in events database 114. Such information may be provided by external sources, such as online services listing scheduled events, as described below in connection with FIG. 15. Alternatively, such information may be manually entered in events database 114 by a system operator. In one embodiment of the present invention, individual users may provide user-defined categories in the form of group calendars including scheduled events the user wishes to share with other users. For example, a project leader may create a personal calendar including meetings and deadlines related to the project, and then share that personal calendar as a group calendar. Other users involved with the project may then subscribe to the group calendar as an event category. If desired, security measures may be provided restricting access to a group calendar, so that only selected users can retrieve the information.

In one embodiment, a search field (not shown) is provided to allow interactive searching of the event directory.

Figure 15:
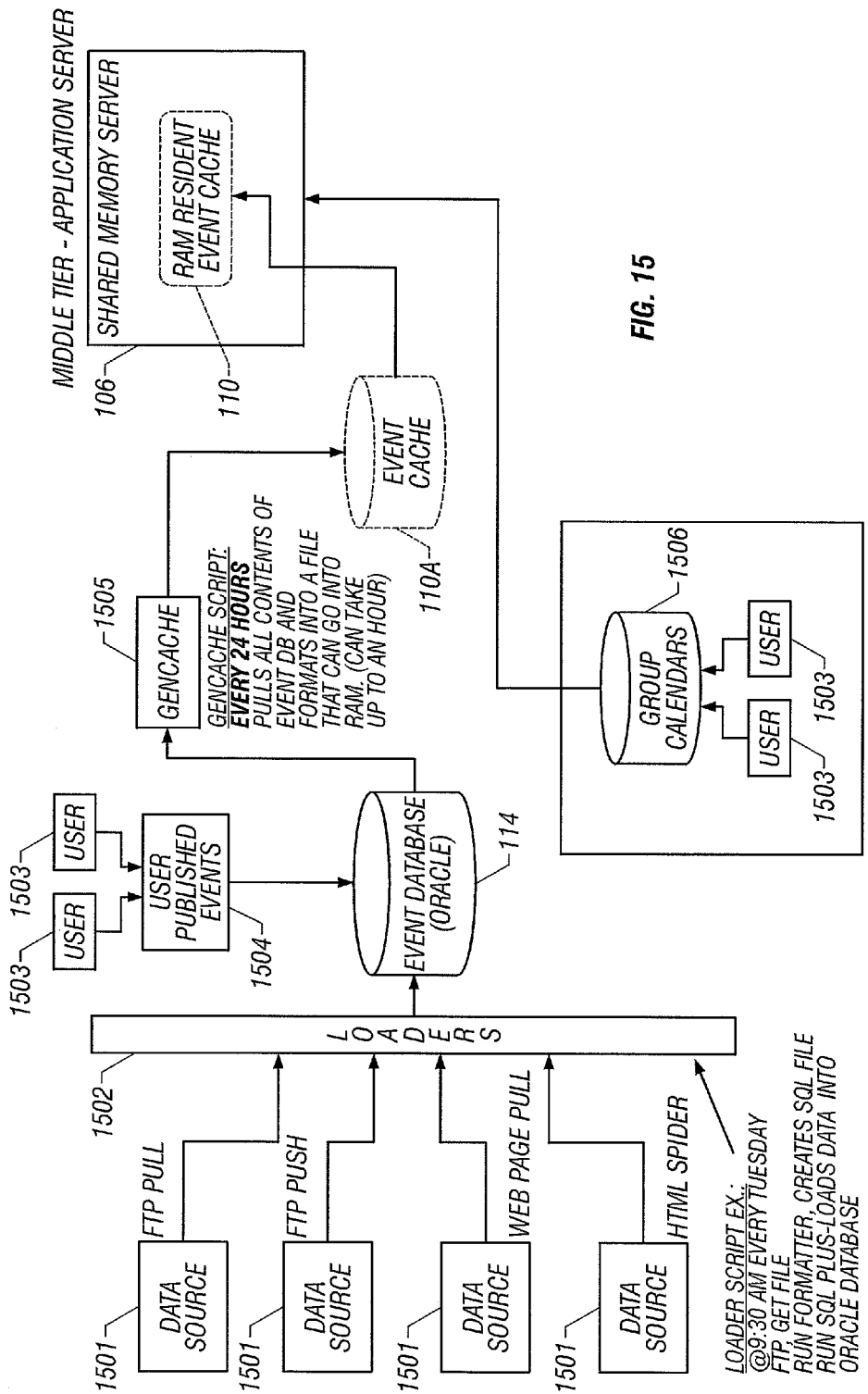
FIG. 15 is a block diagram showing the collection of events data according to the present invention.

Referring now to FIG. 15, there is shown a block diagram illustrating the collection of events data according to one embodiment of the present invention. The process performed by the apparatus of FIG. 15 receives event feeds from content partners, processes the event data, and stores them in event database 114. Information from database 114 is cached into shared memory for access by application server processes as needed. The elements of FIG. 15 are implemented as a collection of programs and scripts for automated operation and import of event data.

Loaders 1502 are software scripts resident in database servers layer 104 for extracting events data from external data sources 1501 such as web pages, publicly-accessible files and databases, and the like. In one embodiment, loaders 1502 are configured to extract such data on a regular basis from a predefined set of sources 1501. For example, a loader 1502 might be configured to run a File Transfer Protocol (FTP) operation to obtain data from a source 1501 at 9:30 a.m. every Tuesday morning, then to run the obtained data through a formatter to create a Structured Query Language (SQL) file, and finally to run a script which loads the data from the SQL file into events database 114. Loaders 1502 may obtain information from data sources 1501 by any conventional means, such as for example: FTP pull (FTP operation initiated by loader 1502); FTP push (FTP operation initiated by data source 1501); web page push (Hypertext Transfer Protocol (HTTP) operation initiated by data source 1501); or Hypertext Markup Language (HTML) spider (automated traversal through a series of HTML pages on the World Wide Web).

Once loaders 1502 have collected information from data sources 1501, the data is formatted and written to events database 114. Users 1503 may also provide user-published events 1504 manually, which are also added to events database 114. In addition, a group calendars database 1506 may be provided for storing events information related to a particular predefined group of users. Users 1503 can contribute event information that they would like to share with other users 1503 in a particular group. Such event information is written to group calendar database 1506 and then transferred to events database 114.

In one embodiment, application servers 106 read and operate on event data using an event cache 110 (see FIG. 1A) in order to provide improved performance. In order to facilitate such operation, a cache generation (GenCache) operation 1505 is provided. GenCache operation reads events database 114 on a regular basis (e.g. daily) and generates an Event Cache file 110A containing selected event data in a format that can be transferred to RAM. In general, it is preferable if Event Cache file 110A contains data that is likely to be accessed, so that such access can be achieved without resorting to additional reads from events database 114. Once Event Cache file 110A has been generated, it is written to event cache 110 in application server 106. Event cache 110 is RAM-resident in server 106 and is therefore capable of being accessed more efficiently than can events database 114.

Once event cache 110 is in place, individual processes 108 can access events data from cache 110 as needed. If a particular event datum is not present in cache 110, application server 106 initiates a read from events database 114 to obtain the needed information.

Figure 7A:
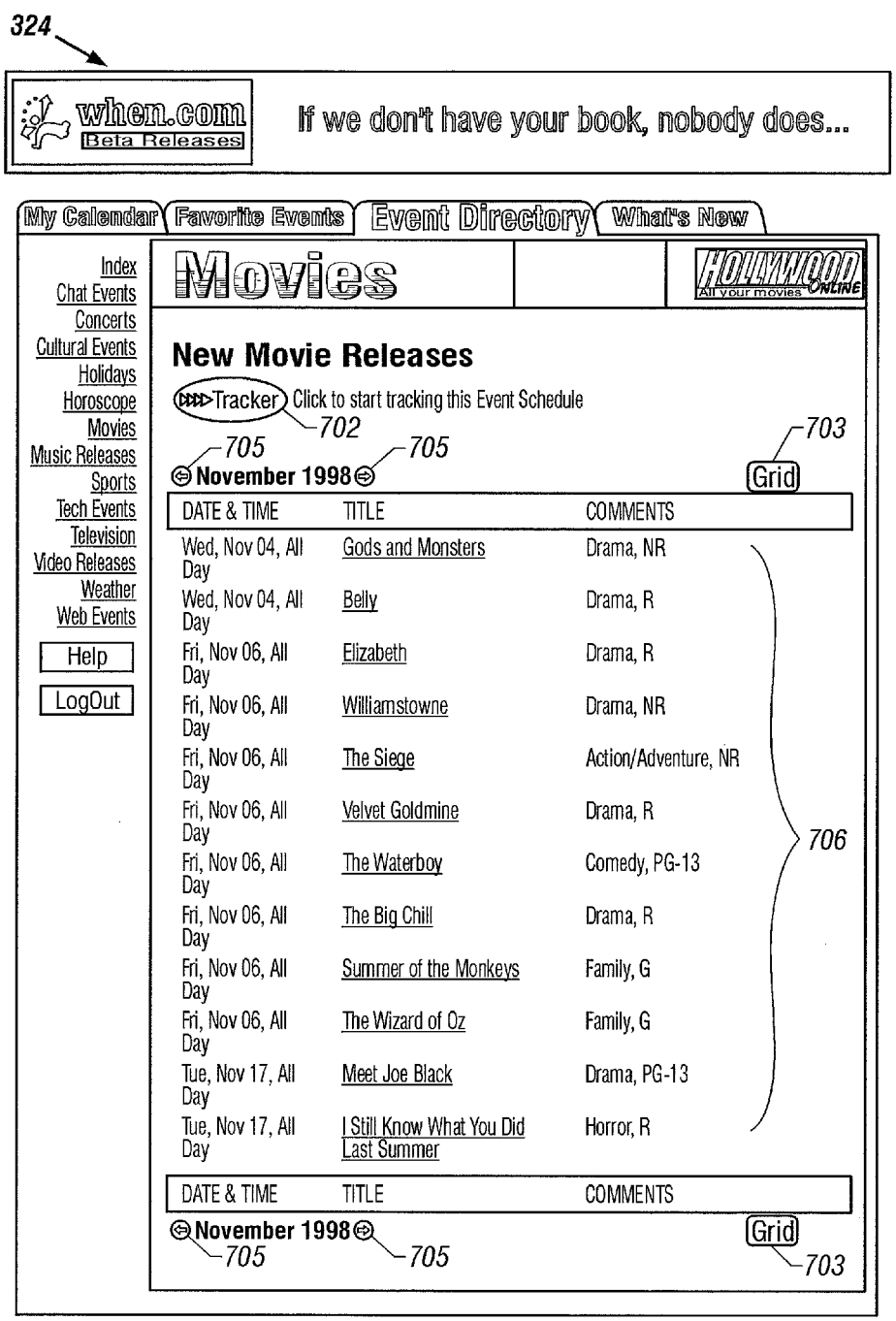
FIGS. 7A and 7B are screen shots of an example of an event schedule in month view.
Figure 7B:
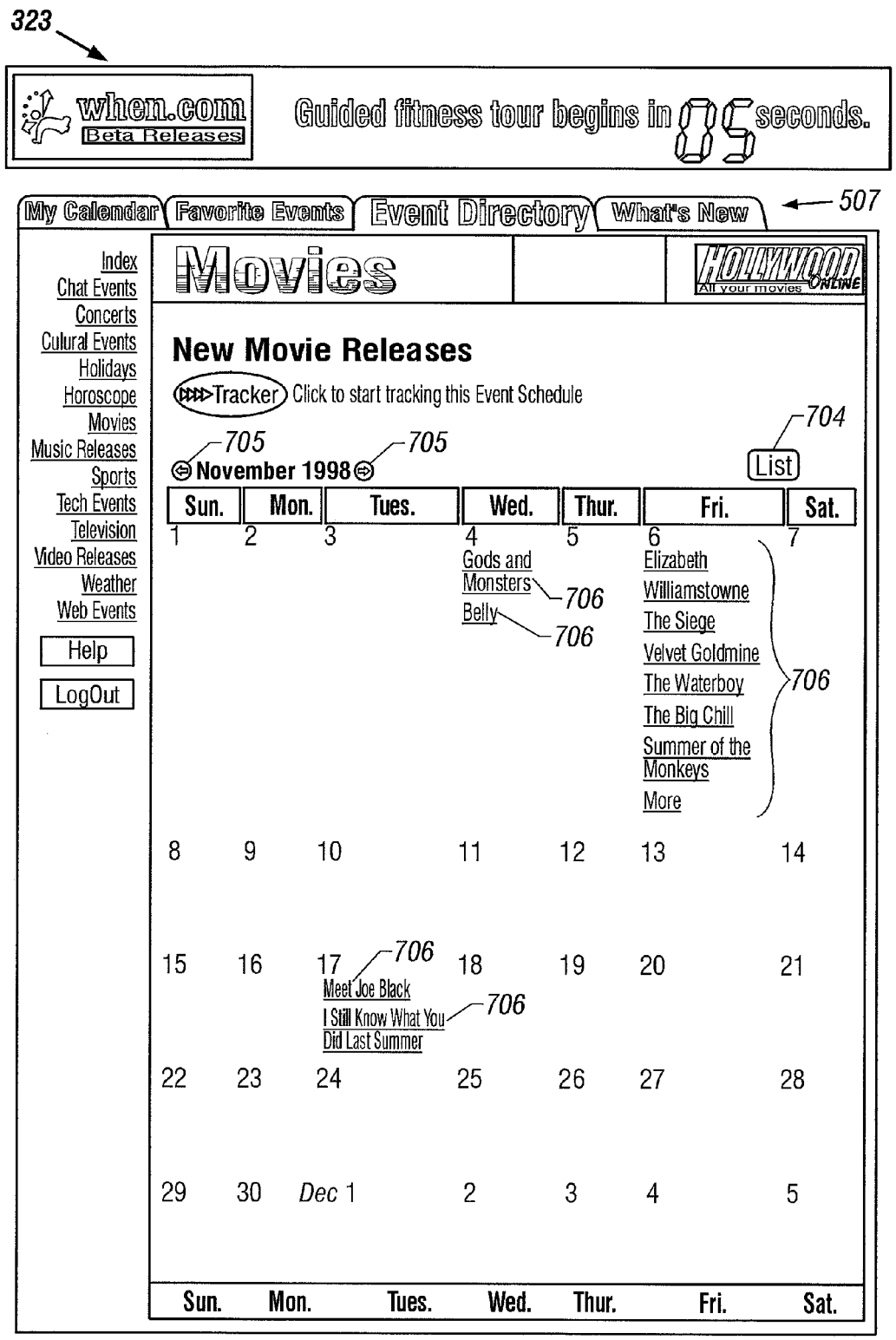

Referring now to FIGS. 7A and 7B, there are shown screen shots of the Event Schedule Month View in list format 324 and in grid format 323. Screen shots 324 and 323 may be displayed, for example, when a user selects a particular event category by clicking on one of the links 601 in the Event Directory screen 317. In screen 324, the user may click on grid button 703 to be transferred to screen 323. In screen 323, the user may click on list button 704 to be transferred to screen 324. Buttons 705 allow the user to view other time periods besides the one being displayed. In one embodiment, the information displayed in screens 324 and 323 comes from events database 114, which in turn may be collected from external sources, as described above in connection with FIG. 15.

Events 706 belonging to the selected event category are shown in list form in screen 324, or in grid form in screen 323. The user can obtain additional detail regarding any listed event 706 by clicking on the link associated with the event 706. System 100 then displays an event detail page (not shown) containing the additional detail.

The user can subscribe to the displayed event category by clicking on Tracker button 702. Events from the event category will then appear on the Favorite Events screens 313-315, as described below. In addition, in one embodiment the user can add individual events to his or her personal calendar without subscribing to the event category, by clicking on a button within the event detail page (not shown), or on a button (not shown) on screen 324 or 323.

Figure 8:
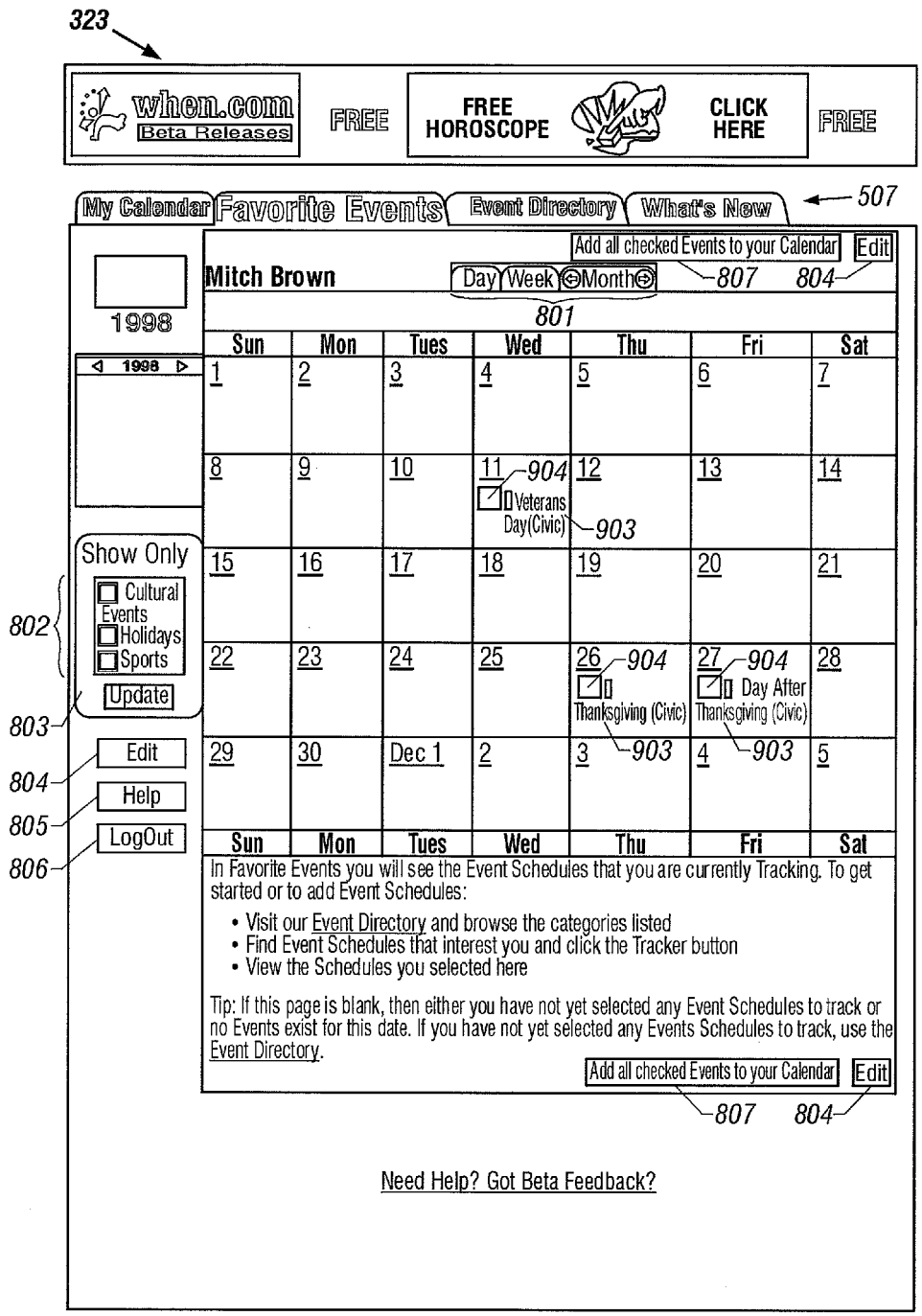
FIG. 8 is a screen shot of a Month View of a Favorite Events screen.

Referring now to FIG. 8, there is shown a screen shot of a Month View 315 of a Favorite Events screen according to one embodiment of the present invention. Favorite Events screen allows the user to view events from selected categories to which he or she has subscribed. The user can select whether to view all events for a time period from subscribed categories, or to view events only from selected subscribed categories. Thus, the subscribed categories can be thought of as Òlayersó which can be placed on top of one another and viewed together, separately, or in any combination. This layering concept extends to views of the user's personal calendar, as will be seen below. Buttons 802 specify individual event categories for display, which the user can select in any combination desired. In one embodiment, buttons 802 are provided for each event category to which the user has previously subscribed. Screen 315 shows all events belonging to the selected event categories in the month being displayed. Update button 803 takes the user to the Event Directory screens 317-319 (see above), where he or she can subscribe or unsubscribe to event categories.

In one embodiment, the Favorite Events screen also contains event categories representing shared group calendars of other users. Thus, users can create personal or work-related group calendars which can be shared and subscribed to as are public calendars. Such group calendars are listed as additional buttons 802, allowing the user to select or de-select individual group calendars are view associated events as desired, Òlayeredó on top of other displayed events in screen 315.

In one embodiment of the Favorite Events screen, several different views of events are available. For example, the user may select from a Day View 313, a Week View 314, or a Month View 315. Navigation bar 801 provides links to the available views. Navigation bar 507 provides links to other screens, as described elsewhere in this disclosure. Additional buttons are provided, including an Edit button 804 which allows the user to change personal preferences, a Help button 805 for providing access to Help pages 326, and a Log Out button 806 which exits the system.

A checkbox 904 is provided for each event 903. The user can add an event 903 to his or her personal calendar by clicking on the associated checkbox 904 and clicking on button 807. Other mechanisms may be provided for adding individual events, or groups of events to the user's personal calendar. The particular user interface configuration to be used may depend on the characteristics of the network on which system 100 is implemented.

Figure 9:
FIG. 9 is a screen shot of a Week View of a Favorite Events screen.

Referring now to FIG. 9, there is shown a screen shot of a Week View 314 of a Favorite Events screen according to one embodiment of the present invention. As with screen shot 315, the user can select individual events belonging to subscribed categories, for inclusion in his or her personal calendar. The week-long view of FIG. 9 shows one week's worth of events in a columnar format.

Navigation bar 507 provides access to other screens of system 100. Buttons 802-806 provide the same functionality as described above in connection with FIG. 8; namely, these buttons allow the user to specify which event categories are to be displayed (or overlaid on one another) in the Favorite Events screen, and also provide Edit, Help, and Log Out functions. Navigation bar 801 allows the user to navigate among Day View 313, Week View 314, and Month View 315 of the Favorite Events screens.

In the Week View shown, each day of the week is displayed as a column 902. The user can click on the column header to see a Day View 313 for the selected day. Within each column 902, events 903 are listed in a grid format by time of day, with a separate space provided for all-day events. In an alternative embodiment, events 903 can be listed using other formats, such as by category, or alphabetically, for example. As in screen 315, the user can add events to his or her personal calendar by clicking on check boxes 904 and button 807.

Figure 10:
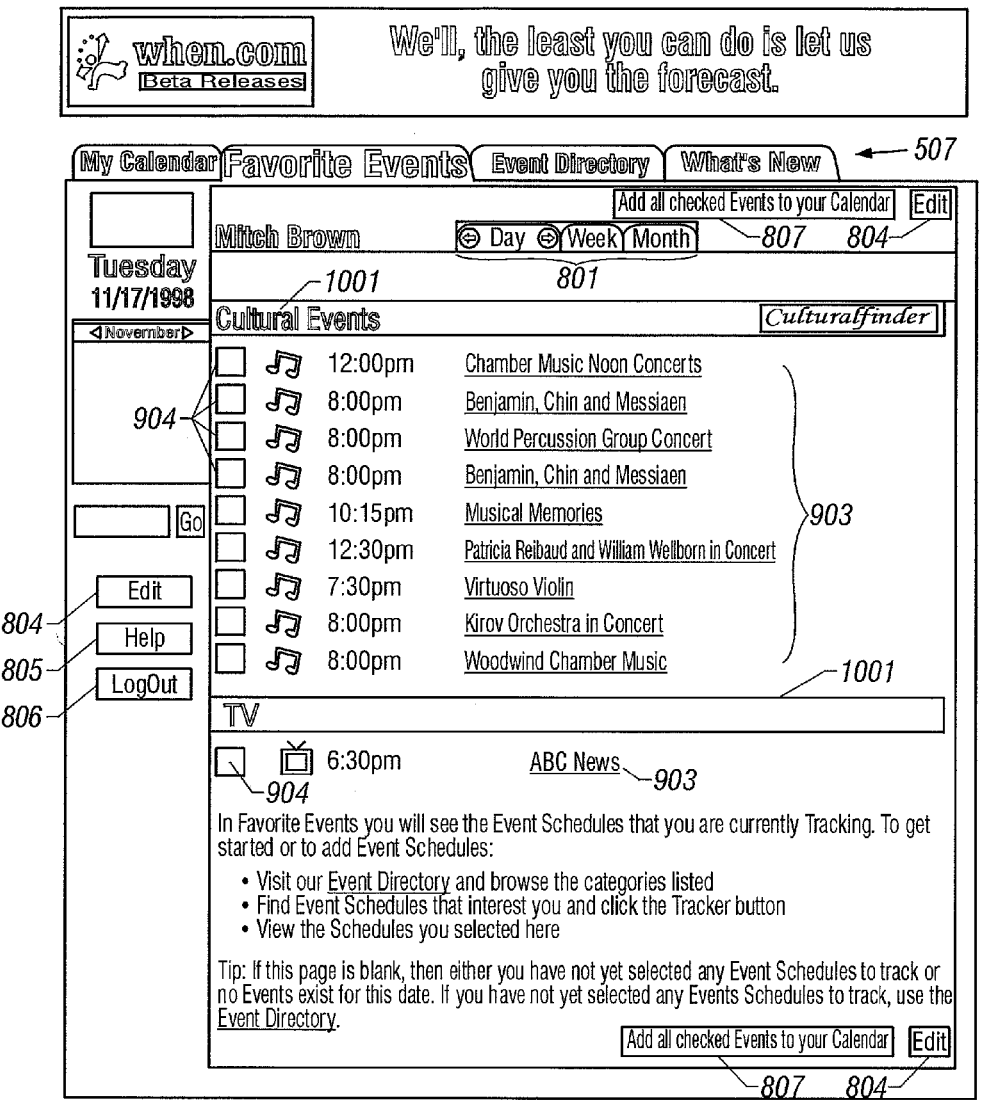
FIG. 10 is a screen shot of a Day View of a Favorite Events screen.

Referring now to FIG. 10, there is shown a Day View 313 of a Favorite Events screen. Operation of Day View 313 is similar to that of Month View 315 and Week View 313, described above. Day view 313 shows events associated with a particular selected day.

In Day View 313, events are divided by category, denoted by category headings 1001. Events 903 are displayed for each event category heading 1001. Buttons similar to buttons 802 in Month View 315 and Week View 313 may be provided, allowing selection and de-selection of particular event categories for display. In one embodiment, an event category is only listed if it contains events within the day associated with the current display. In other words, in this embodiment, if there are no Cultural Events occurring on the day being displayed, the event category heading 1001 for Cultural Events will be omitted from the display.

In one embodiment, each event category heading 1001 button (not shown) providing a link to the Event Schedule for the category. This link takes the user to a screen, similar to that shown in FIGS. 7A and 7B, listing events belonging to the specified category. Underneath the heading 1001 is a list of individual events 903 belonging to the category. For each event 903, a date and description is provided, as appropriate. If applicable, a time of day may also be shown. If appropriate and available, a link may be provided to a more detailed description of the event. Finally, button 904 is also provided for adding the event to the user's personal calendar. Thus, as described above, the user can select individual events belonging to subscribed categories, for incorporation into his or her personal calendar. This provides improved flexibility, in that the user need not add an entire calendar and thereby possibly add events which are not of interest, but can tailor the personal calendar to his or her individual needs. In some embodiments, addition of all events in a category can also be provided without requiring individual selection of each event, by clicking on a button (not shown) associated with the category as a whole.

In one embodiment of the present invention, each subscribed category is color-coded, and individual events belonging to the category are tagged by a color flag matching the color of the category. Thus, in the example shown, the movie releases category may be associated with the color blue, and all movie release events would then include a small blue tag. One skilled in the art will recognize that other visual characteristics could be used to associate events with categories, such as a distinctive icon, font, or other technique.

Figure 11:
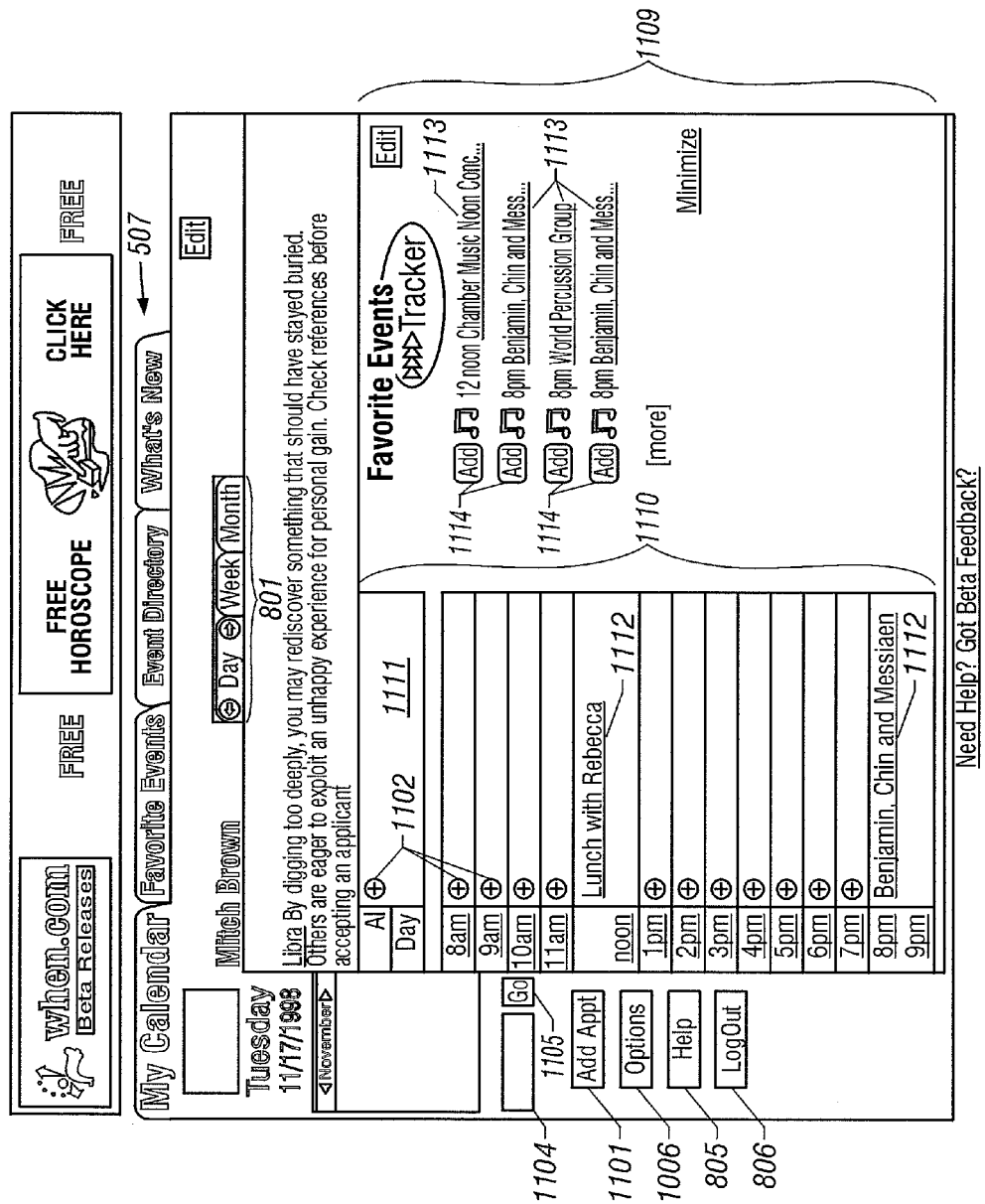
FIG. 11 is a screen shot of a Day View of a My Calendar screen.

Referring now to FIG. 11, there is shown a screen shot of a Day View of a My Calendar screen 307 according to one embodiment of the present invention. On this screen, the user is able to view and manipulate his or her personal calendar, containing events that have been previously selected from subscribed categories, as well as events that have been manually added by the user.

Navigation bar 507 provides access to other screens of system 100, as described above. Navigation bar 801 allows the user to select among a Day View 307, Week View 308-309, or Month View 310 of his or her personal calendar.

Date entry field 1104 allows the user to type in a date, and by clicking the Go button 1105, go to the My Calendar screen 307 for the indicated date. Options button 1106 takes the user to a screen (not shown) where preferences and personal options can be set. Help button 805 is a link to Help pages 326, and Log Out button 806 exits the system.

Add Appointment button 1101 allows a user to manually add an event or appointment to the personal calendar, using a screen similar to that shown in FIG. 14, described below. In this way, the invention can be used as a tool for integrating personal events and appointments in a calendar with selected events obtained from an outside source, by overlaying the two types of events as layers in a single calendar. In one embodiment, the user may also click on buttons 1102 to add an appointment at a particular time of day.

In an alternative embodiment, My Calendar page 307 may also include a list of Òto-doÓ and/or Òall dayÓ items for the day. These items generally do not have a specific time of day associated with them; rather, they are items that the user has entered to remind him or her of tasks to be performed sometime during the day. The user can add such items using the Add Appointment button 1101, in much the same way as appointments are added.

Also shown is a daily planner 1110 listing events and appointments 1112 for various times throughout the day. These events and appointments are obtained by reference to the user's personal records in database 112 reflecting a manually entered item (such as a lunch appointment), or they may be descriptive of events obtained from events database 114 representing event data from an outside source (such as, for example, a concert or movie). In one embodiment, events selected by the user from an outside source are replicated in the user's personal records in database 112, so that he or she can freely modify them. In another embodiment, events selected by the user from an outside source are not replicated, but rather a reference (or ÒpointerÓ) to the event in database 114 is stored in the user's personal records, allowing the invention to access the data describing the event from the outside source. One advantage to the latter technique is that any subsequent updates to the event can automatically be reflected by the application when the user views the My Calendar screen.

In one embodiment, the user can click on any event shown in list 1110 or in the list of Òall dayÓ events 1111, to be presented with a screen showing more detail on the selected event. The user may also edit the event if desired, as described below in connection with FIG. 14.

In another embodiment, a link may be provided for making a purchase associated with a particular event. For example, if the event is a concert, a link to an on-line ticketing service maybe provided, for purchasing tickets to the concert. The link can be targeted to a particular event within an electronic commerce site that sells tickets, so that the user need not re-enter the particulars of the event in order to purchase tickets. Alternatively, such an approach may be used to register for an event such as a tradeshow, by providing a link to a web page allowing the user to enter registration information, payment information, and the like. Where possible, certain fields of the web page may be pre-filled with default information based on a profile previously entered by the user and stored in database 112.

Similar techniques can be used for on-line sale of books, music, and the like, in connection with calendared events such as release dates. In one embodiment, the user may use the present invention to track birthdays, anniversaries, and the like; the system may then remind the user of such an event and provide the opportunity to buy cards, gifts, and the like, as well as provide direct links to electronic commerce pages and sites that are of interest in connection with the upcoming event. The system of the present invention can thus facilitate on-line commerce related to events that are of particular interest to the user.

In one embodiment, a subscreen 1109 may be shown when selected by the user, displaying a list of Favorite Events. Subscreen 1109 contains a section for each event category selected by the user. Individual events 1113 associated with each event category, and belonging to the current date, are displayed. The user can click a button 1114 to add an event 1113 to the personal calendar for display on the My Calendar screen 307.

In one embodiment, the user can select which categories of events are to be displayed in the My Calendar screen 307, so that he or she can view a subset of subscribed categories, if desired. This provides a multi-layering function, wherein each category can be considered a ÒlayerÓ that can be viewed in combination with other layers as selected by the user. The user can also select group calendars for display; events from such calendars are shown in the My Calendar screen as an additional ÒlayerÓ, if desired.

Figure 12:
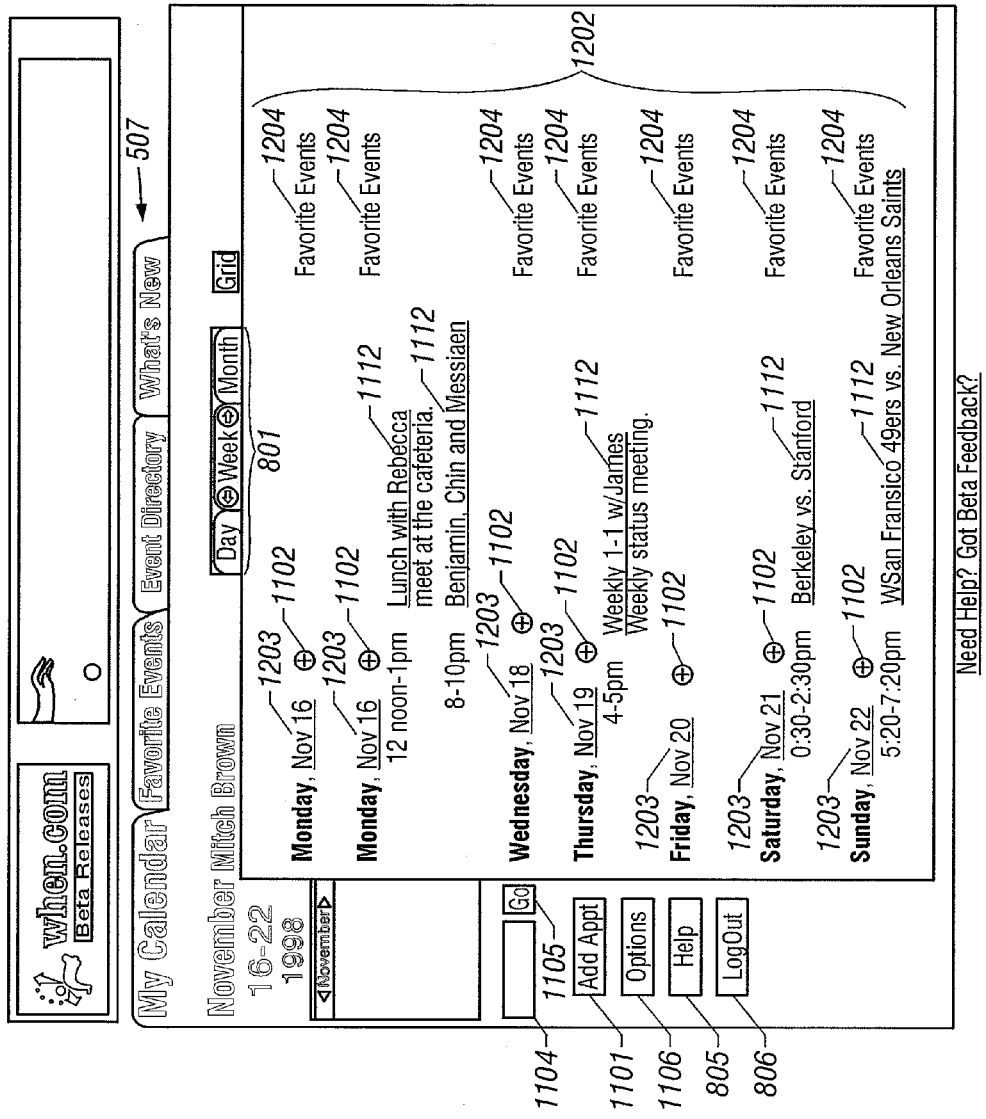
FIG. 12 is a screen shot of a Week View of a My Calendar screen.

Referring now to FIG. 12, there is shown a screen shot of a Week View of a My Calendar screen 308 according to one embodiment of the present invention. Screen 308 operates in a similar manner as the Day View 307 described above in connection with FIG. 11. Events for a week-long period of time are shown, in list format 1202. Grid button 1205 provides access to a screen (not shown) that displays the week's events in a grid format. Links 1203 provide access to individual Day View screens for each day in the week. Buttons 1204 open a Favorite Events tracker subscreen similar to 1109 in FIG. 11, for displaying individual events within categories. Events 1112 are shown as links, which when activated access a detail screen for each event. Buttons 1101, 1102, 1106, 805, 806, and 1105, and field 1104 operate in a manner similar to the corresponding buttons in FIG. 11.

Figure 13:
FIG. 13 is a screen shot of a Month View of a My Calendar screen.

Referring now to FIG. 13, there is shown a screen shot of a Month View of a My Calendar screen 310 according to one embodiment of the present invention. Screen 310 operates in a similar manner as the Day View 307 described above in connection with FIG. 11. Events for a month-long period of time are shown, in grid format 1302. Links 1203 provide access to individual Day View screens 307 for each day in the month. Events 1112 are shown as links, which when activated access a detail screen for each event. Buttons 1101, 1106, 805, 806, and 1105 operate in a manner similar to the corresponding buttons in FIG. 11.

Figure 14:
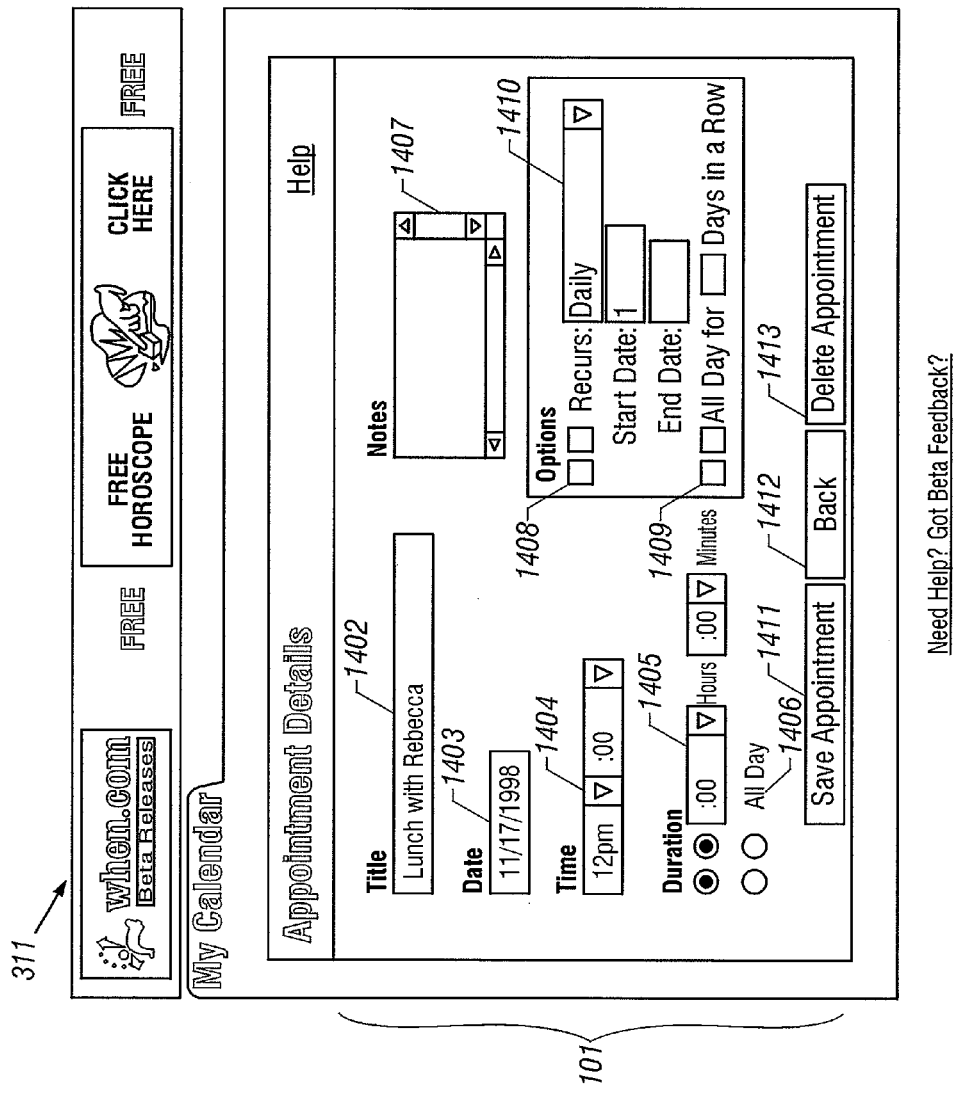
FIG. 14 is a screen shot showing a My Calendar detail screen.

Referring now to FIG. 14, there is shown a screen shot showing a My Calendar detail screen 311, containing detailed information describing an event. This subscreen can be used for entering information for a new event, or for making changes to information for a previously entered event. It is accessed by clicking on an event 1112 in screens 307, 308, or 310.

Event description 1401 contains several fields for displaying and making changes to various pieces of information concerning the event, such as a title 1402, date 1403, start time 1404, duration 1405, check box 1406 for allday events, and recurring event information 1408, 1409, and 1410. A notes field 1407 is also provided for miscellaneous information. Fields 1402 to 1410 are populated with information from database 112 for manually-entered appointments, or with information from database 112 or 114 for other events. In alternative embodiments, other fields may also be provided, such as a reminder field for gift-related events, and the like. The selection of particular additional fields to be provided may be customizable.

In an alternative embodiment, screen 311 contains a link to another page allowing the user to perform other activities related to the scheduled appointment (such as an online purchase relating to the item).

Once the information has been entered, edited, and/or verified, the user can click on the Save Appointment button 1411 to save the entered information and return to the My Calendar screen. Alternatively, the user can click the Back button 1412 to cancel all changes made to the event and return to the My Calendar screen. Finally, the user can delete the appointment by clicking button 1413.

Application Implementation

Referring again to FIGS. 1 and 1B, the operation of application server 106 to implement the application will now be described. Generally, application server 106 responds to requests relayed by web servers layer 102. Generally, such requests are provided to server 106 in HTTP format. In response to such a request, server 106 optionally performs some action (if appropriate) and returns an HTML page to the user. In one embodiment, HTTP requests are relayed to a load balancer 105. Load balancer 105 dispatches the request to the appropriate process 108.

In one embodiment, each request is handled by a class in an object-oriented language such as C++. Server 106 inspects its registry to determine which class to invoke for each request. The Uniform Resource Locators (URLs) requests to server 106 contain the name or identification of the class that can handle the request.

To handle a request, server 106 creates an instance of the appropriate class and invokes its ÒExecuteÓ method. The parameters of the HTTP request are made available to the class as a name-value pair list in the base class. The Execute method parses the input parameters, performs actions, and generates HTML output.

Figure 16:
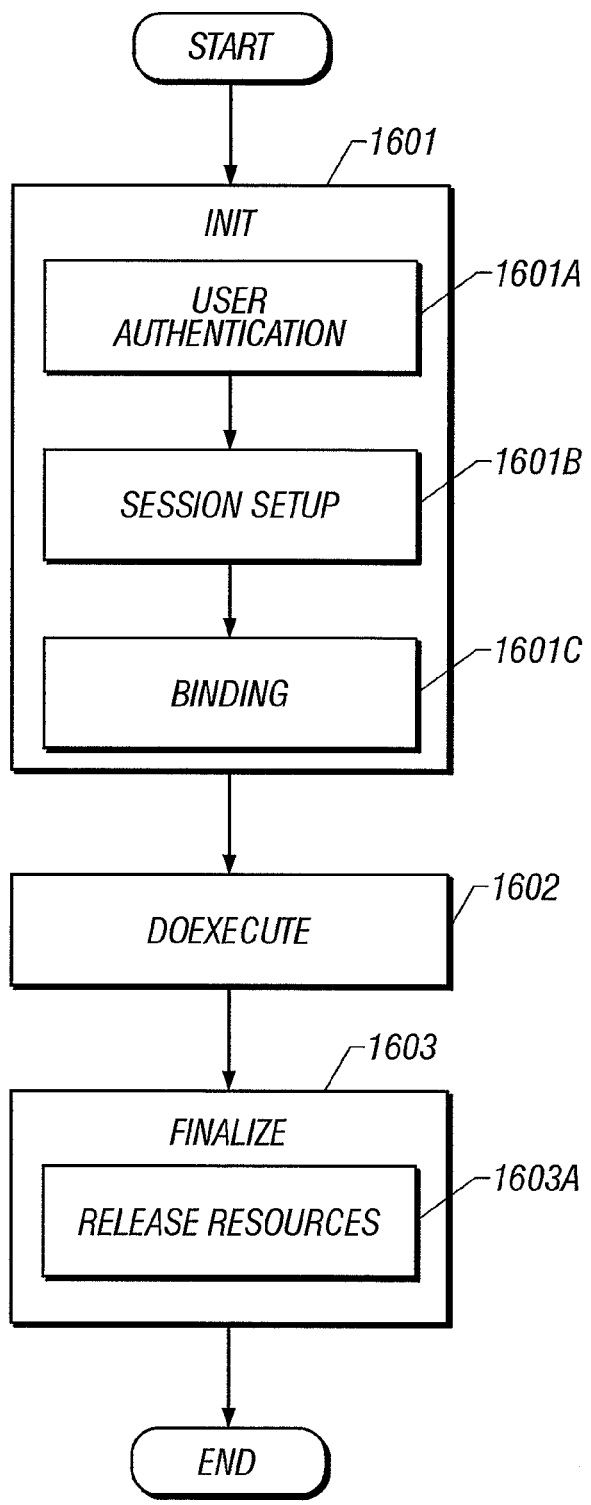
FIG. 16 is a flowchart showing basic operation of a default Execute method.

Referring now to FIG. 16, there is shown a flowchart of the basic operation of the Execute method. The method performs the following actions:

1601: Calls the class's Init method. The default Init method provided by the base class handles user authentication 1601A, setup of sessions 1601B, and binding 1601C of common resources needed by the class.

1602: Calls the class's DoExecute method. The DoExecute method performs the actual work and returns HTML data. The actual DoExecute method to be performed is determined by the particular subclass being implemented, which typically overwrites the default DoExecute method.

1603: Calls the class's Finalize method. The default Finalize method releases 1603A session and default resources.

The DoExecute method for a particular class generally overrides the default DoExecute method 1602, and performs one or more of the following tasks:

Parse parameters included in the request into members of the class or temporary variables, as needed.

Perform some action by calling lower level service Application Programming Interfaces (APIs); for example, saving data to a database.

Output a componentized HTML document. This may be implemented, for example, by calling the template engine in conjunction with a Parts Map, as described in more detail below, along with user interface ÒpartsÓ and related helper classes to construct an HTML page.

The base class provides general purpose Init 1601 and Finalize 1603 methods for most classes. Classes that require login are automatically authenticated by the base class, freeing them from having to implement authentication redirect logic. The base class performs parameter checking to provide security by detecting invalid requests. The base class also performs logout operations when needed. In addition, the base class provides several general-purpose methods for handling, for example, building of URLs for redirection, saving temporary session data, and parsing simple parameters.

Figure 17:
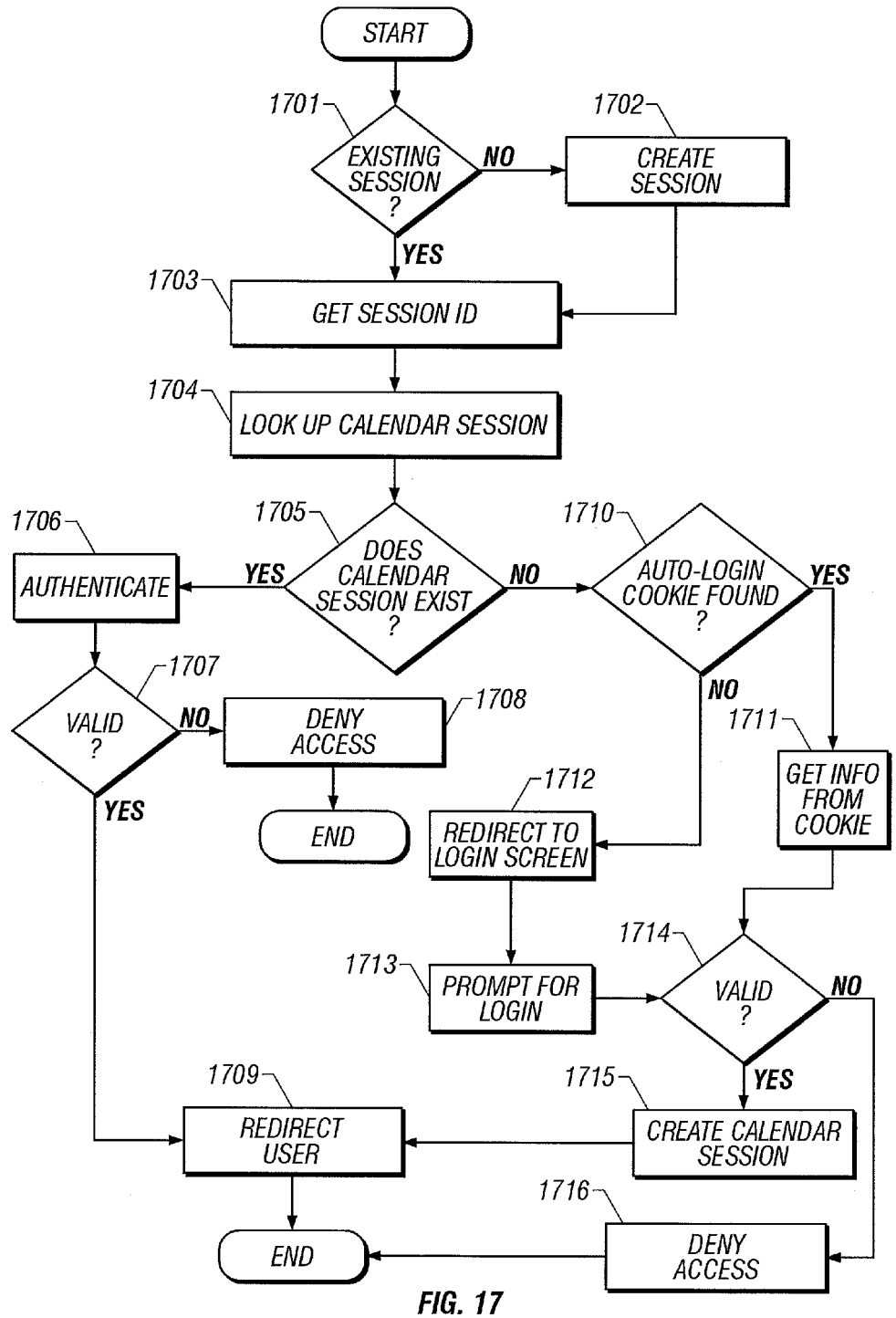
FIG. 17 is a flowchart showing a user authentication process.

Referring now to FIG. 17, there is shown a flowchart of the user authentication process 1601A as handled by the base class. Classes that do not require authentication may circumvent this process by overriding a RequiresLogin method to return FALSE.

Two separate sessions are maintained for each user, in connection with the authentication process of FIG. 17:

a long-term session, managed by the load balancer and assigned a session ID (this session is automatically bound to future requests using browser cookies, as is known in the art); and a calendar session, managed by a session manager (created upon authentication with the calendar service, assigned the same ID as the long-term session).

The base class first checks 1701 for an existing long-term session. If none exists, one is created 1702. The base class then retrieves 1703 the Session Id and looks up 1704 a calendar session having that ID. If a calendar session having the corresponding ID exists 1705, the user is authenticated 1706 and the authentication is checked 1707 to see if it is valid. If so, the user is allowed to proceed; he or she is redirected 1709 to his or her default calendar view and the authentication process ends. If the authentication is invalid, access is denied 1708.

If in 1705 no calendar session having the corresponding ID exists, the base class checks 1710 for an Òauto-loginÓ cookie on the user's machine. Autologin allows users to return to the web site without having to login. The autologin cookie contains the user's encrypted login name and password. If the cookie exists, the base class retrieves 1711 the login information. If the cookie does not exist, the user is redirected 1712 to a login screen. In one embodiment, the base class saves the original URL that the user was trying to access. The user is then prompted 1713 to enter login information.

Login information from the auto-login cookie or from the user's entry is checked 1714 for validity. If it is valid, the base class creates 1715 a calendar session for the user, and the user is allowed to proceed. If a URL was previously saved (in 1712) the user is redirected 1709 to that location; if not, the user is redirected 1709 to his or her default calendar. If in 1714 the login information is invalid, the user is denied access 1716.

In addition, in one embodiment a user may be automatically logged out by the session manager if they remain idle for some predefined period of time, or when the server is heavily loaded. In this case, the user must login again when he or she returns.

Figure 18:
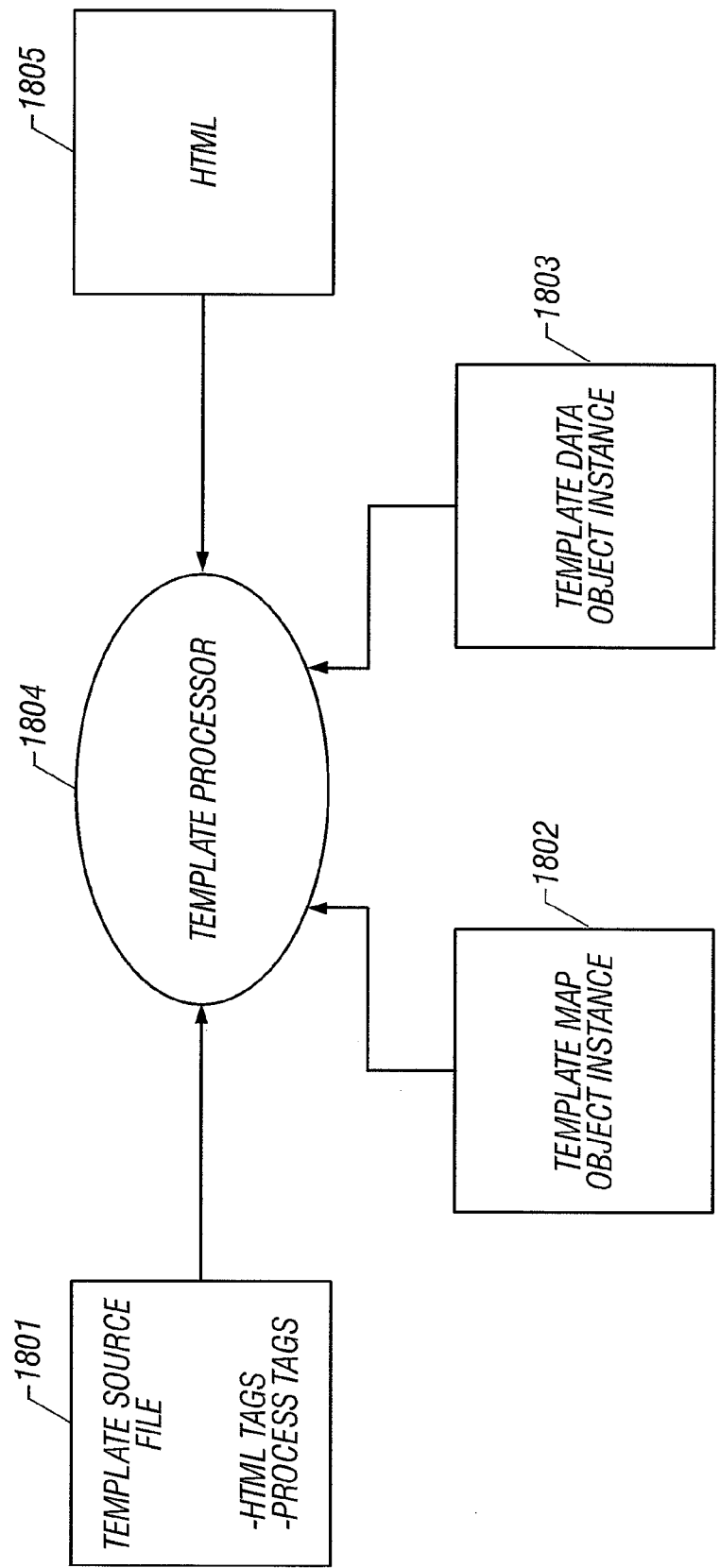
FIG. 18 is a block diagram of the operation of a template processor to generate an HTML file.

Referring now to FIG. 18, there is shown a block diagram of the operation of a template processor 1804 to generate an HTML file. This technique is used in one embodiment of application server 106, with the template processor operating as part of a process 108 to generate output for presentation to the user. Template source file 1801 contains HTML and process tags. Processor 1804 uses process tags to determine what items in file 1801 need to be replaced with dynamic data.

Template map object instance 1802 is used by processor 1804 to implement simple replacement of identifiers in source file 1801. Map 1802 contains a list of name-value pairs. For each process tag in file 1801, processor 1804 consults map 1802 for the name specified in the tag. If the name is found, the value associated with the name is inserted in place of the process tag. Template data object instance 1803 is used by processor 1804 to fill in data elements in a template file. For example, object instance 1803 may contain a list of items with attributes, such as events, calendars, and the like. Processor 1804 uses object instance 1803 to iterate through a set of data, replacing process tags with the attributes of the elements.

Thus, to process a template source file 1801, processor 1804 scans through file 1801 for process tags. When it finds such a tag it requests values from template map object instance 1802 and template data object instance 1803. These values are used to replace the process tags. Processor 1804 also uses template data object instance 1803 to iterate over data sets referenced by process tags.

For example, consider a source file 1801 containing the following source:
    <process type =cell id=UserName>Replaceme</process>
    <process type=tile id=events>
      <process type=cell id=events.title>Event Title</process>
      <process type=cell id =events.date>12/31/1999</process></process>

Processor 1804 would scan through the file and first find the UserName cell tag. The type cell indicates that a simple replacement should be done, with data from either the template map 1802 or the template data object 1803. Template map 1802 is checked first for a UserName element. If no value is found there, template data object 1803 is checked. If a value is found, the text ÒReplaceMeÓ is replaced with the value. If no value is found the text ÒReplaceMeÓ remains intact.

Processor 1804 would then find the process tag with the keyword events. The type tile indicates that processor 1804 should loop over a data set contained in template data object 1803. The keyword events identifies which data set to use. Processor 1804 calls the following methods of the template data object 1803:

IsEmpty: Determines if the data set events is present in template data object 1803;
MoveNext: Moves to each element in the events data set, returns FALSE when there are no more elements;
GetValue: Retrieves individual attributes from the current data element in events.

Thus, in the example given above, processor 1804 would call MoveNext for as many events included in the events data set. Processor 1804 would then call GetValue to obtain the events.title and the events.date attributes for each element in the data set.

Once processor 1804 has processed all of the process tags in source file 1801, it generates an HTML file 1805 which can be passed to the user and read by a browser.

Figure 19:
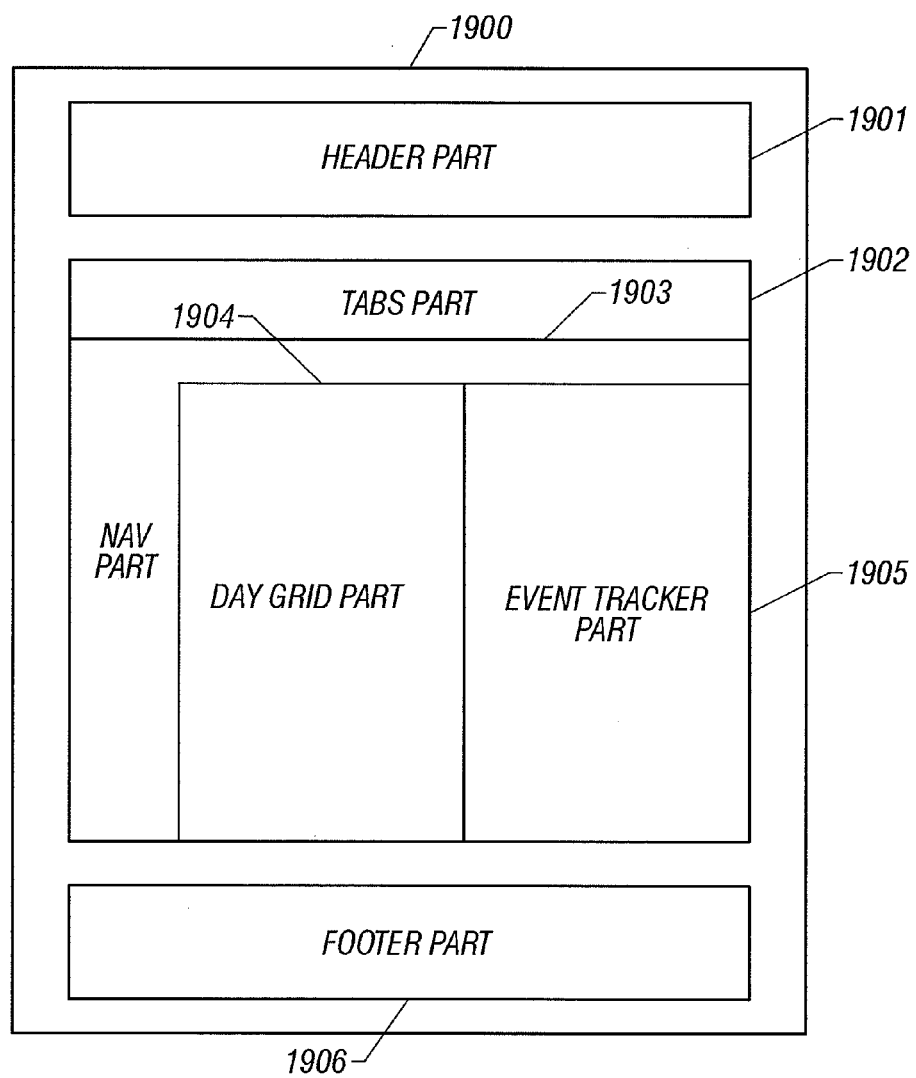
FIG. 19 is a diagram showing a document template having several parts.

Operation of processor 1804 will now be described in more detail. Referring now to FIG. 19, there is shown an example of a document template 1900 containing several parts, including header part 1901, tabs part 1902, navigation part 1903, day grid part 1904, event tracker part 1905, and footer part 1906. Parts 1901-1906 are modular user interface components used to implement and generate the various pages for the present invention. Thus, an HTML document is modularized into parts that can each be generated by a distinct class 2001 run by application server 106.

Figure 20:
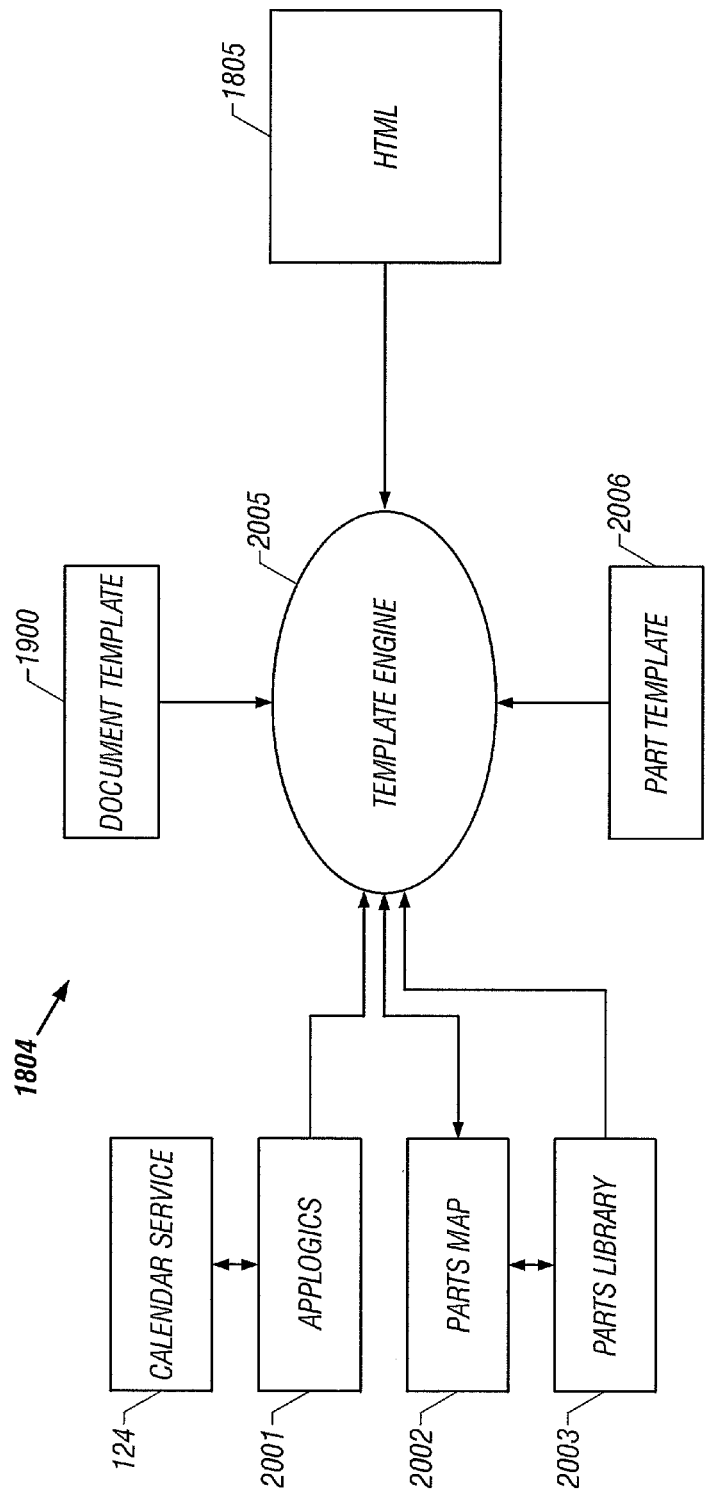
FIG. 20 is a block diagram of the detailed operation of a template processor to generate an HTML file.

Referring also to FIG. 20, there is shown a block diagram of the detailed operation of template processor 1804 to generate HTML output 1805.

To implement the component model exemplified by document template 1900, two levels of template evaluation are used:

Document-level template evaluation (controlled by the class) specifies which user interface components (parts) are included in a particular document, and how they are to be laid out. A document-level template 1900 is used for this purpose. In addition, the template may include some common formatting and style elements.
Part-level template evaluation (controlled by the parts within a document) is used to evaluate each part in the document by consulting a part template file 2006. The HTML data 1805 is then generated for that part's particular area in the document.

For each document, a single document-level template evaluation is performed, and any number of part-level template evaluations are performed.

In the document-level template 1900, custom process tags are employed to specify parts to be included in the document. For example, the following example contains three parts:
    <process type=whenHeader title="My Calendar Day View">Replace Text</process>
    <process type=whenTab template=my CalendarTab.html>Default Text</process>
    <process type=whenFooter>Replace Text>/process>

Part map 2002 translates each part tag into a section of HTML. Part map 2002 is passed by classes 2001 to template engine 2005 when document-level template evaluation takes place. Parts map 2002 acts as a dispatcher, interpreting custom tags and supplying needed parts classes from parts library 2003. When engine 2005 requests that parts map 2002 translate a custom tag, map 2002 dispatches control to an instance of the appropriate part class from parts library 2003 by calling its Output method.

The Output method of each part generates the HTML that represents its user interface component in the document. Template engine 2005 replaces the custom process tag with the HTML data generated by the Output method. Most parts use the template engine 2005 to create their HTML output, in order to implement part-level template evaluation. The part-level evaluations actually cause re-entrance of template engine 2005 since the part evaluates its template 2006 during a callback from document-level template processing.

Template class 2001 contains the IsEmpty( ), MoveNext( ), and GetValue( ) methods described earlier.

Thus, for example, in implementing a calendar-oriented parts, the following elements are employed:

Part template file 2006: contains the HTML and process tags for creating the part output.

Part class implementation in template class 2001: A C++ class that implements the Output method. This class embodies the presentation logic of the part, and may defer to helper classes for core presentation algorithms.

The template class 2001 may perform any of the following, for example:

Establishing references to the cache of user data from the session manager.

Establishing a context object for communicating with the calendar engine.

Finding the data needed during template evaluation (including, for example, accessing the calendar engine to obtain lists of -events for all the days being displayed).

Parsing input parameters received with the HTTP request into arguments used during template evaluation (such as, for example, start date, end date, calendar ID, event IDs, and the like).

Optionally creating a Template Map class and populating it with name-value pairs used for replacement during template evaluation.

Invoking template engine 2005, passing it the template file name, template map, and custom template data object.

The template class 2001 objects may perform any of the following, for example:

Provide convenient constructors for evaluation by the part. The constructor accepts arguments needed during template evaluation. The constructor may also validate data and transform it into a more usable form.

Override the IsEmpty( ) method for the data set that the template data serves. A single template data class object may serve more than one data set. For example, the Day Grid part's Template Data class serves two data sets: a collection of all-day events and a collection time intervals. IsEmpty( ) is called by template engine 2005 when it begins processing a data set. IsEmpty( ) determines whether there is any data in the set, and if so, position itself to point to the first element in the data set.

Override the MoveNexto method to move to the next available element in the data set. If there are no more elements, MoveNext( ) returns FALSE. Template class 2001 may implement MoveNext( ) by incrementing an internal counter or by advancing the position of an event list obtained from the Calendar Engine.

Override the GetValue( ) method to return values for each attribute of the current data element. This may include accessing methods of calendar engine objects, formatting them, and returning them in a buffer. GetValue( ) is also used to show or hide areas in a template. By returning a null string, GetValue( ) can effectively hide a section of the template. This may be used to implement conditional template evaluation.

Classes 2001 and Parts 2002 access the data they require prior to starting template evaluation. Generally, such data includes lists of events obtained from calendars. Other types of data that may be required include, for example, user profiles, calendar attributes, lists of tracked calendars, weather information, and the like. The calendar service serves up most of the data required by the user interface presentation logic.

Session Management

As described above in connection with FIG. 1B, application implementation element 121 includes session management 123 which authenticates, tracks, and manages user sessions for calendaring operations, and stores a cache of user and calendar data as needed to maintain sessions. The operation of session management 123 will now be described in more detail.

Referring again to FIGS. 1A and 1B, when a user is authenticated, a session is created, as is known in the art of web application development. The session exists until either the user logs out or the session expires. In one embodiment, a session expires when the user remains idle for a certain time period as specified in system configuration files.

Sessions serve two primary purposes: 1) they obviate the need for reauthentication of the user with each web page access; and 2) they facilitate the use of a cache to store data (such as calendar data) in order to avoid unnecessarily retrieving the same data repeatedly from databases 112 or 114. In one embodiment, only one thread 115 of a process 108 may access a session object at any given time. Other requests to access a session object are blocked until the thread 115 that is currently accessing the object is done. This technique reduces the amount of thread safe checks needed to assure data integrity.

When a user logs on and a session commences, certain information may be pre-fetched from database 112 and transferred to user cache 109, so that subsequent access to this data will be faster. The pre-fetching occurs immediately after login and, preferably, prior to the user accessing his or her calendar. The pre-fetching need not be complete for the user to access his or her calendar.

Periodically, session management 123 prunes the list of stale sessions by removing sessions that have been idle for longer than a specified time-out period, specified in predefined configuration information. In addition, in periods of high load session management 123 may remove a session before the time-out period is reached, as further specified in the configuration information. A user attempting to access the system after his or her session has been removed must logon once again to re-establish a session.

Calendar Service 124

As described above in connection with FIG. 1B, application server 106 includes calendar service 124 which: implements the core object model for accessing user profiles, calendars, events, calendar links, and collections of objects; implements event lookup, object caching, and persistence; and serves both personal calendars and event directory data using a common object model. The operation of calendar service 124 to implement the present invention will now be described in more detail.

Figure 21:
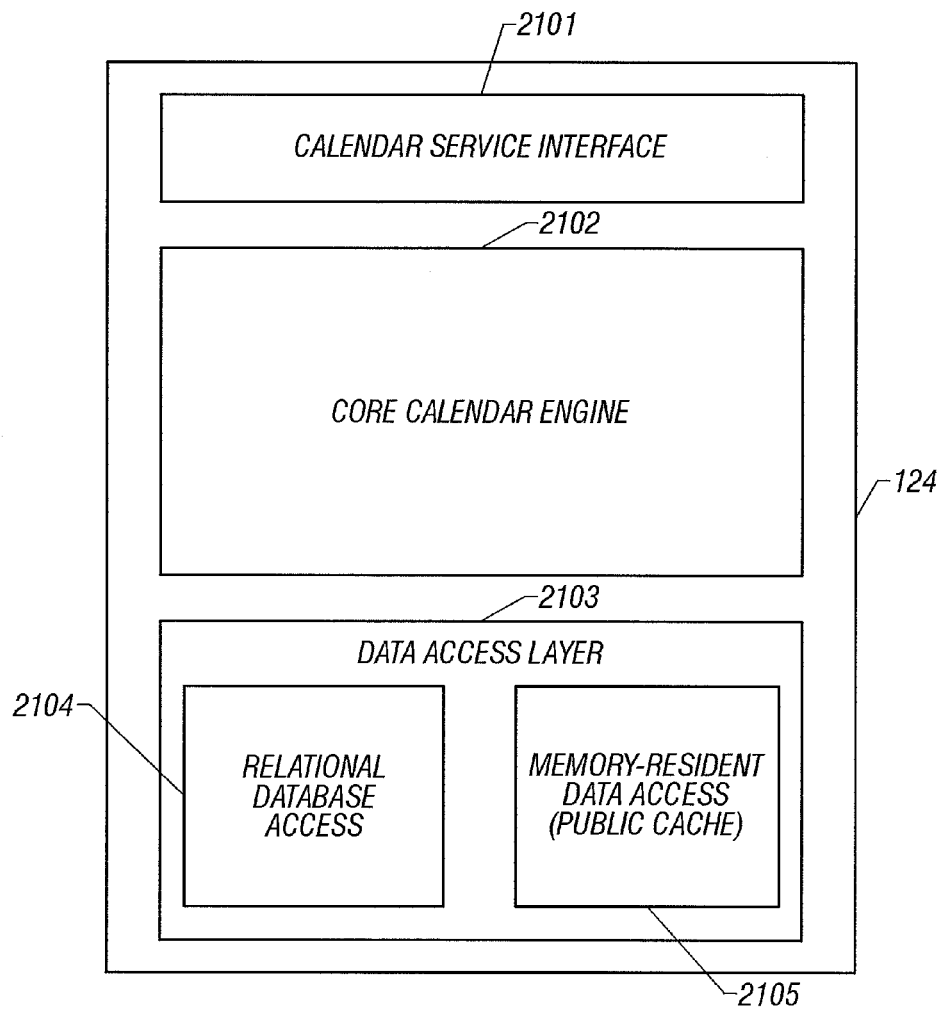
FIG. 21 is a block diagram of a calendar service according to one embodiment of the present invention.

Referring now to FIG. 21, there is shown a block diagram of calendar service 124 according to one embodiment of the present invention. Calendar service interface 2101 defines the contract between calendar service 124 and the application servers layer 103 of system 100, or of any other client of service 124. Core calendar engine 2102 implements the core algorithms and logic of the calendar engine. Data access layer 2103 provides the persistence behavior of all objects in calendar service 124. It implements access to both relational data 2104 (user data) and memory resident data 2105 (event directory).

Calendar Service Interface 2101. Calendar service 124 provides the programming interface for accessing objects. In one embodiment, these objects are the only interface to calendar service data that is available to application servers layer 103 or any other client of service 124. These objects include, for example:

User Account: Contains a user's profile, personal calendar, referenced calendars, and display preferences. The user account is the primary object stored in the cached session object.

Calendar: Provides the common interface to calendars of all types (both personal and event directory schedules). Calendars are containers for individual events, and they interact with Event List and Day List objects to provide access to the events they contain.

Event: Provides a common interface to events of all types, including personal events, event directory events, and linked events. The same class is used to represent recurring and non-recurring events.

Calendar Link: Represents some relationship between a user and a calendar. For example, there may be a ÒtrackingÓ relationship for the event tracker, as described above. A calendar link provides access to the underlying calendar object instance.

Day Link: Provides a convenient collection of events partitioned by day. The day list contains a set of Event List object instances—one for each day within a certain date range. Can also be used as an iterator to traverse through the contained Event Lists one at a time.

Event List: Provides a collection of events sorted in various ways (such as by date, title, and the like). Can also be used as an iterator to traverse through the contained events one at a time.

Calendar List: Represents a collection of ÒlinkedÓ calendars. Contains a set of Calendar Link objects. Each Calendar Link points to a Calendar object instance. The Calendar List can be sorted by various means.

Sponsor/Category/Partner: Provides the interface to both sponsor and category information. A calendar can have an associated sponsor as well as an associated category and an associated partner, if desired.

Figure 22:
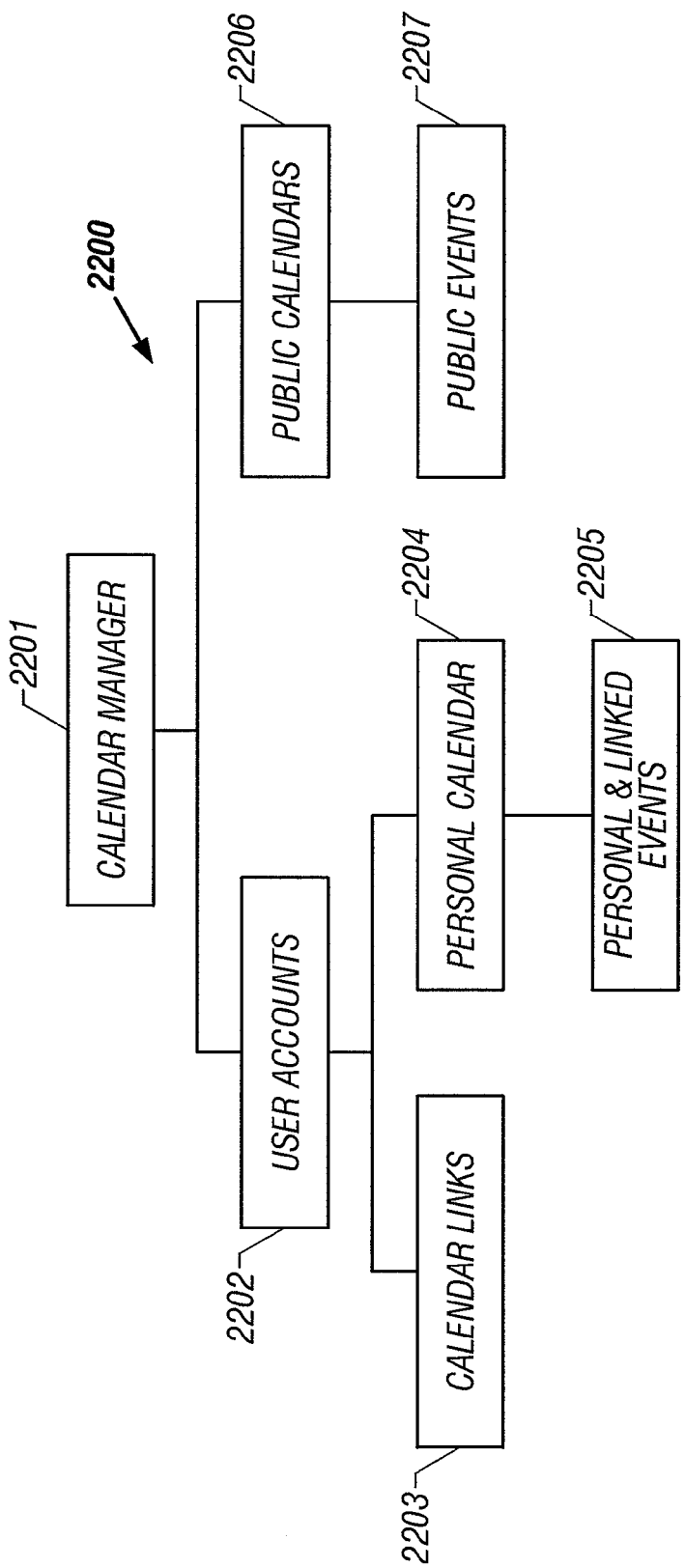
FIG. 22 is a block diagram showing an example of an object ownership hierarchy.

Object Ownership Hierarchy 2200. Referring now to FIG. 22, there is shown an example of an object ownership hierarchy 2200. Calendar service 124 provides a global calendar manager object 2201. Calendar manager object 2201 is the starting point for accessing objects in calendar service 124. In one embodiment, all calendar service objects are indirectly created through calendar manager object 2201.

Calendar service 124 employs an object ownership hierarchy to control the life cycles of objects. For example, event objects are owned by a single calendar object. The calendar object acts as a container for each event, and also controls the access rights, modification, deletion, and creation of the event.

In FIG. 22, calendar manager 2201 serves up both user account objects 2202 and public calendar objects 2206 (event directory). For user accounts, authentication is required before access to a user account is granted. This can occur either via user login or by creation of a new user account, as described previously. Once a user account object 2202 has been crated, it is possible to access the user's personal calendar object 2204, tracked calendar links 2203, and personal profile through the user account object 2202 instance.

For public calendars, authentication is not required. Calendar manager 2201 searches for the desired calendar and returns an object instance that provides access to the calendar's events and attributes 2206 and 2207.

Access Control. Access to calendar service objects and methods is controlled in two ways:

Explicit access checking: Certain operations require that the caller's identity be explicitly compared with the access permissions of the object being requested. For example, calendar manager 2201 requires a valid login name and password before it will create a user account instance 2202.

Implicit access: Access to some objects is controlled indirectly by relying on some previous explicit access check. For example, once access to a user account has been granted, the caller is free to access the contents of the associated personal calendar and calendar links without further access checks. This is implemented using session management, as described previously.

Access control is implemented using a context object. Calendar manager 2201 creates context objects for callers of calendar service 124. Operations that require an explicit access check are defined to take a context parameter. The context identifies the user performing the operation and the access level of that user. Calendar objects check the context permissions against the operation being performed to ensure appropriate access. In this way, security leaks can be avoided even when the application code contains a programming bug.

Object Creation and Modification. Objects are created and modified by their owning parent object, according to the defined hierarchy. Internally, objects implement their own interfaces.

Parent objects control the modification, deletion, and creation of objects they contain. This allows the parent to modify its internal structures when its contents change. Furthermore, the implementation class can be hidden from clients of calendar service 124, so that parent objects act as an object factory for objects they contain.

Creating a new object involves two steps. First, the caller requests a new instance of an object type from the parent. The parent creates a new modifiable object instance and returns it to the caller. The object instance does not yet persist in the calendar service database. Second, the caller requests an ÒupdateÓ of the contained object from the parent. The object may be an existing object or a new object. The caller implements the update by writing changes to the database and updating its internal structures. For example, when a calendar updates a recurring event, it may need to recreate the expanded event instances due to a change in the recurrence rule.

When deleting an object, the caller merely asks the parent to delete the contained object.

Releasing Objects. As described previously, parent objects provide the means to access instances of their contained objects. Parent objects also control the release of their contained objects. When a client of service 124 is finished with a calendar service object, it notifies the parent, which releases the object instance.

This allows the implementation of calendar objects to be hidden from clients, so that the constructors and destructors of object classes are restricted (protected). Thus, the parent object can implement object memory and resource management in any manner desired.

Calendar Types and Domains. In one embodiment, calendar service 124 provides a single interface class for calendars. This interface class is used for both personal calendars and event directory schedules (public calendars) even though they have different attributes and persistence models. Calendar service 124 provides the concept of a ÒdomainÓ for any object in the system. This domain is used, for example, to distinguish between personal and public calendars and events.

Accessing Calendar Contents. Calendar service 124 provides two types of access to events in calendars. Each access type has several variations, to support the needs of application servers layer 103.

The first type of event lookup serves a series of events in a Day List. A Day List is a list of event lists. Each list contains a set of events for a single day. The Day List contains an event list for each day in its date range (for example, a week of events would be sorted into seven event lists). The Day List lookup is convenient for displaying calendar-oriented views of events, since it is very easy to determine the number of events on any given day within the date range. The Day List lookup interface is implemented by a Day List object. Callers use a SetTimeSpan( ) method to generate the list of event lists from either a calendar or a list of calendars.

The second type of event lookup serves events for a specified date range in one contiguous event list object. The Event List lookup is used to display lists of events (such as for pages 307 and 308) rather than calendar-oriented displays (such as pages 309 and 310). The Event List lookup interface is implemented by a Calendar class. Callers use a GetEventList( ) method to obtain an aggregate event list. Variations of GetEventList( ) include:

Date Range: Returns all events from a calendar within a specified date range.

Page Number: Returns a certain page of events starting from a specified date. A page is defined to be a certain number of events. For example, if the page size is 50, then page 2 would return an event list containing events 51 through 100 starting on the specified date.

Layered Calendar Views. Layered Calendar Views display the contents of multiple calendars on a single calendar display such as Views 307, 308, 309, or 310. Layered Calendar Views are implemented by calendar service 124 as a Day List object that contains events from multiple calendars. More specifically, the Event Lists contained by the Day List contain events from multiple calendars.

The Day List class implements the Layered Calendar View. Callers use a SetTimeSpan( ) method of the Day List and pass it a calendar list specifying all the calendars to be included in the display.

Core Calendar Engine 2102. Core calendar engine 2102 implements the core algorithms and logic of calendar service 124, including:

Object creation, deletion, and modification;
Control of object persistence operations;
Event lookup for day lists and event lists;
Object collections and sorting;
Event caching;
Time-zone translation of events; and
Expansion of recurring event instances from recurrence rules.

Interface and Implementation Classes. As described previously, calendar service interface 2101 defines a set of classes that define the contract between application servers layer 103 and calendar service 124. Core calendar engine 2102 returns instances of these classes to the caller.

In one embodiment, the implementation of these objects is achieved by calendar service 124 defining a set of ÒengineÓ subclasses that embody the implementation. The implementation classes are collectively referred to as the CE Layer classes, while the interface classes are known as the CI Layer classes.

Calendar Manager 2201. Calendar Manager 2201 is a global object, created at service startup. It creates and manages user accounts, public calendars, partner objects, and context objects.

Many calendar service operations use a context parameter to validate the access rights of the caller. In one embodiment, a context object is employed to embody access information. The context object includes, for example:

The User ID of the person initiating the request (a User ID of zero indicates guest access).

Access Mode: Provides information as to the access rights of the user.

Reference to the template class making the request.

Reference to a database transaction object.

Contexts can be created as follows:

CreateGuestContext returns a context object with guest access rights. The guest rights are not associated with any particular user.

LoginNewUser creates a context object as part of new account creation. The context has the access rights of the new user account that is created.

LoginUser creates a context object as part of the login process.

The context object has the access rights of the user account that is authenticated.

A context object can be used for any number of calendar service 124 operations. In one embodiment, state information is not maintained in the context. Session management 123 caches a context object in user session data for all calendar service operations during the life of the user session.

User Account Login and Registration. As described previously, the LoginNewUser and LoginUser methods control user registration and login respectively. LoginNewUser creates a new user account implementation object (CDUserAccount class), fills in the profile information, and saves the account object to the user database. The account object creates itself and a set of other objects associated with the user account (personal calendar object, calendar links list).

Calendar manager 2201 provides access to the event directory calendars via the GetCalendar method. GetCalendar takes a calendar ID and returns a calendar object. In one embodiment, event directory calendars are obtained from calendar manager 2201, while personal calendars are accessed from a user account object.

To implement public calendar lookup, calendar manager 2201 creates an instance of a public calendar (class CDPublicCalendar), initializes it with the requested calendar ID, and instructs the calendar object to load itself from the database. The CDPublicCalendar class implements the database lookup as described below.

On return from GetCalendar, the caller has a pointer to a calendar interface object (class CICalendar). Typically, the caller releases public calendar objects once the template class request has been processed. This is the case for Event Directory pages. However, Public Calendar instances are used to represent a user's tracked calendars. In this case, the Public Calendar instances are cached by the user account object— one for each tracked calendar.

Calendar manager 2201 also serves partner objects. The partner object is a denormalized object containing information about categories and sponsors. Category/sponsor information is referenced by calendars in the event directory. Attributes of the category/sponsor are used in the various pages of the user interface (for example, sponsor name, logo, URL, and the like).

At startup, calendar manager 2201 loads all partner objects from the database and caches them in memory. Calendar manager 2201 provides a single call to get a partner object by ID. Public calendars use this call to return their associated partner object.

User Account Implementation. In one embodiment, user accounts 2202 contain all information associated with a particular user within calendar service 124. User account 2202 is the attachment point for all user data and is the primary object stored in the session cache 109. User account 2202 provides access to the user's personal calendar, the linked calendars (favorite events), and the user's profile information.

User account 2202 provides sole access to a user's personal calendar. Personal calendar object 2204 is created by user account 2202 at registration or login. Personal calendar 2204 has no attributes of its own and is therefore not actually stored in the database. Rather, personal calendar 2204 is an instance of a calendar object that manages a set of events Calendar link 2203 defines a relationship between user account 2202 and a calendar. The relationship can have a type, such as a Òtracked calendarÓ relationship. Calendar links 2203 can be used to denote other types of relationships between users and calendars as well.

User account 2202 manages the set of ail calendar links 2203. It controls the creation, modification, and deletion of link objects, and controls their persistence operations, but in one embodiment does not implement them. When a user account 2202 is loaded, it performs a query for all calendar links 2203 and loads them into an internal list. User account 2202 provides an interface to obtain a copy of the list of calendar links 2203. The list can be sorted in any of a number of ways. Each list copy references the same object instances.

The attributes of a user account 2202 fall into two categories: profile attributes and application settings. Profile attributes define the user's demographics and core account information. The user account 2202 provides methods to change profile attributes. These changes are made to a modifiable instance copy of the user account 2202 object, obtained from calendar manager 2201. Changes to profile attributes are saved immediately in the database.

Application settings are fields that control the behavior and appearance of the application. These may include, for example:

the order of events in the event tracker;
the expand/collapse state of categories in the event tracker; and
the minimize state of the event tracker.

Some application settings are saved immediately when changed, while others are saved when the user's session expires through either explicit logout or session time-out.

The user account implementation class provides a protected method (FlushDeferredChanges) which calendar manager 2201 uses to save application settings prior to deleting the user account object. Deferred write is used in order to minimize database accesses for common application customizations.

Calendar Implementation. In one embodiment, calendar service 124 supports two types of calendars: 1) personal calendars, which contain user-specific private data loaded directly from database 112; and 2) public calendars, which represent schedules in the event directory database 114 which are accessible by any user and whose data is referenced from the shared memory event cache 110.

In one embodiment, the difference between the two types of calendars is the persistence mechanism used to inflate and deflate the calendar and event objects from the two domains.

Before events are served up by the calendar, they are loaded into memory as a set of event object instances. Calendar service 124 maintains an internal event list collection object containing object instances for all event occurrences whose dates fall within the loaded date range, including each instance of a recurring event that falls within the loaded date range. The cached event instances are also translated to the calendar's target time zone and sorted by time.

A calendar implementation class controls the loading and unloading of events over the loaded date range. The calendar implementation class implements a simple loading model which enforces a contiguous range for this date range. The maximum size of the date range is specified in server configuration files, for example as 50 days. The minimum load range size is also specified in server configuration files, for example as 10 days. The minimum load range size defines the ÒchunkÓ size for database queries.

Cache 110 serves to optimize performance by minimizing database accesses to personal calendar. Furthermore, cache 100 pre-sorts events by date and time for the target time zone, as will be described below.

Each calendar has the notion of a Òzone focus.Ó The zone focus is set by the client of calendar service 124 based on the time zone of the user's display. For event directory pages, the zone focus is set to the default time zone for the calendar being viewed. The zone focus for personal calendars is the user's time zone as specified in his or her profile. This is also true for ÒtrackedÓ public calendars (calendars which are displayed with or over the personal calendar).

When a calendar loads its events it also translates the events to its zone focus. This is done so that the calendar's internal event list can be presorted based on the target time zone. Event list sorting is done when the target time zone is known. All-day events do not shift across date boundaries as do events having a specific start time. Pre-sorting the internal cache by date allows event lookups to be highly optimized, requiring no list duplication or sorting.

Recurring Events. A pattern of recurring events can be stored in one database row in database 112 or 114. The individual occurrences of the recurring pattern need not be stored individually. Recurring patterns are stored in a table separately from non-recurring events.

Calendar service 124 loads all recurring patterns from the database the first time the calendar is loaded. The recurring patterns are saved as event object instances in a separate internal recurring event list. When calendar service 124 loads events, it also generates individual event instances from the list of recurring patterns. Thus, calendar service 124 creates an event object instance for every occurrence of each recurring pattern whose date falls in the loaded date range. These recurring event instances are placed in the internal cache in the same manner as non-recurring events.

Each recurring event instance is assigned a unique ID which is a combination of: 1) the event ID of the recurring pattern from which the instance was generated; and 2) the Julian date assigned to the recurring instance. The combined ID is used to uniquely identify recurring event instances by clients of calendar service 124.

When the user modifies the pattern of a recurring event (for example, changes from repeat daily to repeat weekly), calendar service 124 performs the following steps:

1) Delete all the existing recurring event instances associate with that patter from the internal cache;
2) Create new recurring event instances in the internal cache based on the modified pattern; and
3) Save the recurring pattern to the database.

Furthermore, calendar service 124 is equipped to handle a change from a recurring event to a non-recurring event, or vice versa. For example, if a user wishes to change a recurring event to a non-recurring event, calendar service 124 performs the following steps:

1) Delete all recurring event instances associated with that pattern from the internal cache;
2) Delete the recurring pattern ÒmasterÓ event from the internal pattern cache;
3) Delete the database row associated with the ÒmasterÓ event pattern;
4) Insert the non-recurring database row for the event; and
5) Create and possibly insert the new event object instance into the internal cache.

A similar but opposite set of actions is performed when converting a nonrecurring event to a recurring event.

From the above description, it will be apparent that the invention disclosed herein provides a novel and advantageous system and method of multilayered online calendaring and purchasing. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

The invention claimed is:

1. A computer-implemented method for multi-layered online calendaring, comprising:
   a subscriber selecting from a plurality of categories of events to be displayed, said events obtained from event information supplied by an event information publisher, at least a portion of said categories being defined by said subscriber, each of said categories having at least one layer associated thereto,
   displaying at least one event associated to at least one of said selected categories in a multi-layered calendar, where each event category displayed has at least one layer associated thereto; and
   displaying multiple categories simultaneously to provide an integrated personal calendar comprising a plurality of layers showing all events in one place.

2. The method of claim 1, further comprising the step of:
   a subscriber adding appointments and other events manually in a 'my calendar' area, said manually-added appointments and other events having associated thereto at least one layer; and
   displaying said manually-added appointments and other events alongside events selected in an event tracker.

3. The method of claim 1, further comprising the step of:
   a subscriber requesting to be notified when an event is about to occur.

4. The method of claim 1, further comprising the step of:
   a subscriber specifying whether or not to share said integrated personal calendar with other users.

5. The method of claim 1, wherein each event has one or more dates.

6. The method of claim 1, further comprising:
   selecting at least one of the displayed events; and
   adding at least one layer associated to the selected event to said subscriber's personal calendar.

7. The method of claim 1, further comprising:
   responsive to subscriber input, setting up a group calendar to be shared among a group, the group calendar comprising a plurality of layers; and
   accepting subscriber input specifying members in said group;
   wherein every group member can access said group calendar and make changes to it.

8. The method of claim 7, further comprising:
   responsive to subscriber input, specifying different levels of access for different members of said group.

9. The method of claim 1, further comprising importing event layers from other calendars.

10. The method of claim 1, further comprising purchasing any of products, services, and tickets using links associated with displayed events.

11. The method of claim 1, further comprising providing a "what's new" area for alerting said subscriber to new categories and events that may be of interest;
    wherein said "what's new" area may also be used to emphasize particularly important events.

12. The method of claim 1, further comprising:
    providing an event directory having listings of event categories, each category associated to at least one separate layer, optionally arranged by area of interest;
    wherein event categories optionally include any of movie opening dates, sporting events, and computer tradeshows.

13. The method of claim 1, wherein said subscriber selects at least one layer associated to a localized option which restricts events to those located in any of said user's city, state, or other region.

14. The method of claim 1, wherein said subscriber selects from several different views comprising layers associated to displayed events and chooses to view any of one category at a time and all categories at once; and
    wherein events can be sorted by any of date and by category, as desired.

15. The method of claim 14, wherein said subscriber orders and purchases online of any of products, services, and tickets as appropriate for a particular event.

16. A non-transitory computer-readable storage medium storing instructions, the instructions which when executed cause a processor to perform:
    receiving a selection of event categories from a plurality of categories of events to be displayed, said events obtained from event information supplied by an event information publisher, at least a portion of said categories being defined by said subscriber, each of said categories having at least one layer associated thereto,
    displaying at least one event associated to at least one of said selected categories in a multi-layered calendar, where each event category displayed has at least one layer associated thereto; and
    displaying multiple categories simultaneously to provide an integrated personal calendar comprising a plurality of layers showing all events in one place.

17. The non-transitory computer-readable storage medium of claim 16, further storing instructions, which when executed by the processor, cause the processor to perform:
    receiving appointments and other events manually added by a subscriber in a 'my calendar' area, said manually-added appointments and other events having associated thereto at least one layer; and
    displaying said manually-added appointments and other events alongside events selected in an event tracker.

18. The non-transitory computer-readable storage medium of claim 16, further storing instructions, which when executed by the processor, cause the processor to perform:
    receiving, from a subscriber, a request to be notified when an event is about to occur.

19. The non-transitory computer-readable storage medium of claim 16, further storing instructions, which when executed by the processor, cause the processor to perform:
    receiving a selection of at least one of the displayed events;
    receiving at least one layer associated to the selected event; and
    adding said at least one layer to said subscriber's personal calendar.

20. The non-transitory computer-readable storage medium of claim 16, wherein the at least one layer is associated to a localized option which restricts events to those located in any of said user's city, state, or other region.

21. The non-transitory computer-readable storage medium of claim 16, further storing instructions, which when executed by the processor, cause the processor to perform:
    setting up a group calendar to be shared among a group, the group calendar comprising a plurality of layers; and accepting subscriber input specifying members in said group;

wherein every group member can access said group calendar and make changes to it.

22. The non-transitory computer-readable storage medium of claim 16, further comprising instructions, which when executed by the processor, cause the processor to perform:

ordering and purchasing any of products, services, and tickets using links associated with displayed events.

23. A computer-implemented system for multi-layered online calendaring, comprising:

an event information publisher supplying event information;

a user input device;

an event directory to allow a user to view a plurality of categories of events and to select, using the user input device, categories of events that are of interest, wherein at least a portion of said categories are defined by said user, and wherein each of said plurality of categories is associated to at least one separate layer;

an event tracker for allowing said user to select for viewing one or more events associated with the selected categories;

an event retrieval module, for retrieving said one or more selected events, wherein retrieving said one or more selected events comprises retrieving event information providing more details concerning said one or more selected events, the event information obtained from the event information publisher;

a personal calendar module for allowing said user to select one or more of said plurality of categories to add to a computer-implemented personal calendar;

a display module for displaying simultaneously the one or more added categories of events to provide an integrated personal calendar comprising a plurality of layers showing all events in one place, said display module further displaying at least one event associated to at least one of said added categories in a multi-layered calendar; and a personal calendar storage device for storing and retrieving information for the computer-implemented personal calendar.

* * * * *